(12) United States Patent
Kumar et al.

(10) Patent No.: US 10,056,644 B2
(45) Date of Patent: Aug. 21, 2018

(54) LITHIUM ION BATTERIES WITH LONG CYCLING PERFORMANCE

(75) Inventors: Sujeet Kumar, Newark, CA (US); James P. Buckley, San Jose, CA (US); Hang Shi, Torrance, CA (US)

(73) Assignee: Zenlabs Energy, Inc., Fremont, CA (US)

( * ) Notice: Subject to any disclaimer, the term of this patent is extended or adjusted under 35 U.S.C. 154(b) by 1568 days.

(21) Appl. No.: 12/509,131

(22) Filed: Jul. 24, 2009

(65) Prior Publication Data

US 2011/0017528 A1    Jan. 27, 2011

(51) Int. Cl.
*H01M 10/0525* (2010.01)
*H01M 4/36* (2006.01)
(Continued)

(52) U.S. Cl.
CPC ........ *H01M 10/0525* (2013.01); *C01G 53/50* (2013.01); *H01M 4/366* (2013.01); *H01M 4/505* (2013.01); *H01M 4/525* (2013.01); *H01M 4/582* (2013.01); *H01M 4/587* (2013.01); *C01P 2002/50* (2013.01); *C01P 2002/72* (2013.01); *C01P 2006/40* (2013.01); *H01M 2/022* (2013.01); *H01M 2/0217* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| 5,514,488 A | 5/1996 | Hake et al. |
| 6,080,507 A | 6/2000 | Yu |

(Continued)

FOREIGN PATENT DOCUMENTS

| EP | 1742281 A1 | 1/2007 |
| JP | 07-065825 | 3/1995 |

(Continued)

OTHER PUBLICATIONS

Evonik Separion 2009, "Scientific breakthrough: Separion® opens up new markets for lithium ion batteries," http://corporate.evonik.de/en/company/news/lithium_ion_batteries/Pages/separion.aspx.

(Continued)

*Primary Examiner* — Alix E Eggerding
(74) *Attorney, Agent, or Firm* — Christensen, Fonder, Dardi & Herbert PLLC; Peter S. Dardi

(57) ABSTRACT

Batteries with high energy and high capacity are described that have a long cycle life upon cycling at a moderate discharge rate. Specifically, the batteries may have a room temperature fifth cycle discharge specific energy of at least about 175 Wh/kg discharged at a C/3 discharge rate from 4.2V to 2.5V. Additionally, the batteries can maintain at least about 70% discharge capacity at 1000 cycles relative to the fifth cycle, with the battery being discharged from 4.2V to 2.5V at a C/2 rate from the fifth cycle through the 1000th cycle. In some embodiment, the positive electrode of the battery comprises a lithium intercalation composition with optional metal fluoride coating. Stabilizing additive maybe added to the electrolyte of the battery to further improve the battery performance. The batteries are particularly suitable for use in electric vehicles.

12 Claims, 14 Drawing Sheets

(51) Int. Cl.
| | |
|---|---|
| H01M 4/505 | (2010.01) |
| H01M 4/525 | (2010.01) |
| H01M 4/58 | (2010.01) |
| H01M 4/587 | (2010.01) |
| C01G 53/00 | (2006.01) |
| H01M 2/02 | (2006.01) |

(56) References Cited

U.S. PATENT DOCUMENTS

| | | | |
|---|---|---|---|
| 6,171,723 B1 | 1/2001 | Loch et al. | |
| 6,235,427 B1 | 5/2001 | Idota et al. | |
| 6,251,822 B1 | 6/2001 | Peng et al. | |
| 6,337,156 B1 | 1/2002 | Narang et al. | |
| 6,383,687 B1 | 5/2002 | Gibbons et al. | |
| 6,420,071 B1 | 7/2002 | Lee et al. | |
| 6,511,767 B1 | 1/2003 | Calver et al. | |
| 6,528,208 B1 | 3/2003 | Thackeray et al. | |
| 6,616,715 B2 | 9/2003 | Kitoh et al. | |
| 6,677,082 B2 | 1/2004 | Thackeray et al. | |
| 6,680,143 B2 | 1/2004 | Thackeray et al. | |
| 6,682,849 B2 | 1/2004 | Narang et al. | |
| 6,703,163 B2 | 3/2004 | Ogura et al. | |
| 6,730,429 B2 | 5/2004 | Thackeray et al. | |
| 6,749,648 B1 | 6/2004 | Kumar et al. | |
| 6,783,896 B2 | 8/2004 | Tsujioka et al. | |
| 6,787,267 B2 | 9/2004 | Tsujioka et al. | |
| 6,787,268 B2 | 9/2004 | Koike et al. | |
| 6,855,460 B2 | 2/2005 | Vaughey et al. | |
| 6,858,349 B1 | 2/2005 | Luo et al. | |
| 6,884,546 B1 | 4/2005 | Fujita et al. | |
| 6,936,382 B2 | 8/2005 | Mikhaylik et al. | |
| 6,951,699 B2 | 10/2005 | Yata et al. | |
| 6,964,828 B2 | 11/2005 | Lu et al. | |
| 7,026,074 B2 | 4/2006 | Chen et al. | |
| 7,033,702 B2 | 4/2006 | Dasgupta et al. | |
| 7,078,128 B2 | 7/2006 | Lu et al. | |
| 7,135,252 B2 | 11/2006 | Thackeray et al. | |
| 7,166,385 B2 | 1/2007 | Ishida et al. | |
| 7,186,479 B2 | 3/2007 | Krasnov et al. | |
| 7,198,869 B2 | 4/2007 | Ghantous et al. | |
| 7,201,994 B2 | 4/2007 | Watanabe et al. | |
| 7,201,997 B2 | 4/2007 | Ishida et al. | |
| 7,205,072 B2 | 4/2007 | Kang et al. | |
| 7,214,446 B1 | 5/2007 | Bi et al. | |
| 7,229,717 B2 | 6/2007 | Yamaguchi et al. | |
| 7,235,330 B1 | 6/2007 | Fujimoto et al. | |
| 7,252,907 B2 | 8/2007 | Takeuchi et al. | |
| 7,273,682 B2 | 9/2007 | Park et al. | |
| 7,338,734 B2 | 3/2008 | Chiang et al. | |
| 7,351,494 B2 | 4/2008 | Hennige et al. | |
| 7,416,813 B2 | 8/2008 | Fujihara et al. | |
| 7,435,402 B2 | 10/2008 | Kang et al. | |
| 7,452,631 B2 | 11/2008 | Kitao et al. | |
| 7,465,519 B2 | 12/2008 | Tang et al. | |
| 7,497,285 B1* | 3/2009 | Radev | 180/65.225 |
| 7,507,503 B2 | 3/2009 | Amine et al. | |
| 7,510,803 B2 | 3/2009 | Adachi et al. | |
| 7,544,443 B2 | 6/2009 | Fujihara et al. | |
| 7,718,306 B2 | 5/2010 | Cheon et al. | |
| 8,021,785 B2* | 9/2011 | Wakasugi et al. | 429/231.1 |
| 2002/0102462 A1 | 8/2002 | Huggins et al. | |
| 2002/0122973 A1 | 9/2002 | Manev et al. | |
| 2003/0077515 A1 | 4/2003 | Chen et al. | |
| 2003/0087155 A1 | 5/2003 | Cho et al. | |
| 2003/0099883 A1 | 5/2003 | Ochoa et al. | |
| 2003/0157014 A1 | 8/2003 | Wang et al. | |
| 2004/0048152 A1 | 3/2004 | Yata et al. | |
| 2004/0072072 A1* | 4/2004 | Suzuki et al. | 429/231.1 |
| 2004/0151951 A1 | 8/2004 | Hyung et al. | |
| 2004/0161669 A1 | 8/2004 | Zolotnik et al. | |
| 2004/0191630 A1 | 9/2004 | Kawamura et al. | |
| 2005/0019670 A1 | 1/2005 | Amine et al. | |
| 2005/0026037 A1 | 2/2005 | Riley, Jr. et al. | |
| 2005/0031942 A1 | 2/2005 | Hennige et al. | |
| 2005/0202316 A1 | 9/2005 | Hwang et al. | |
| 2006/0051671 A1 | 3/2006 | Thackeray et al. | |
| 2006/0051673 A1 | 3/2006 | Johnson et al. | |
| 2006/0099472 A1 | 5/2006 | Hsu | |
| 2006/0147809 A1* | 7/2006 | Amine et al. | 429/326 |
| 2006/0197496 A1 | 9/2006 | Iijima et al. | |
| 2006/0269834 A1 | 11/2006 | West et al. | |
| 2006/0286438 A1 | 12/2006 | Fujikawa et al. | |
| 2007/0148544 A1 | 6/2007 | Le | |
| 2008/0008933 A1 | 1/2008 | Lampe-Onnerud | |
| 2008/0026297 A1 | 1/2008 | Chen et al. | |
| 2008/0261115 A1* | 10/2008 | Saito et al. | 429/223 |
| 2008/0318122 A1 | 12/2008 | Sun | |
| 2009/0092900 A1 | 4/2009 | Obana et al. | |
| 2009/0253042 A1* | 10/2009 | Sun et al. | 429/231.95 |
| 2009/0263707 A1 | 10/2009 | Buckley et al. | |
| 2009/0263721 A1 | 10/2009 | Haruna et al. | |
| 2009/0297937 A1 | 12/2009 | Lampe-Onnerud et al. | |
| 2009/0305131 A1 | 12/2009 | Kumar et al. | |
| 2010/0086853 A1 | 4/2010 | Venkatachalam et al. | |
| 2010/0086854 A1 | 4/2010 | Kumar et al. | |
| 2010/0112447 A1* | 5/2010 | Yamamoto et al. | 429/223 |
| 2010/0119942 A1 | 5/2010 | Kumar | |
| 2010/0151332 A1 | 6/2010 | Lopez et al. | |
| 2011/0052981 A1 | 3/2011 | Lopez et al. | |
| 2011/0052989 A1 | 3/2011 | Venkatachalam et al. | |
| 2011/0076556 A1 | 3/2011 | Karthikeyan et al. | |
| 2011/0111294 A1 | 5/2011 | Lopez et al. | |
| 2011/0111298 A1 | 5/2011 | Lopez et al. | |
| 2011/0136019 A1 | 6/2011 | Amiruddin et al. | |
| 2011/0236751 A1 | 9/2011 | Amiruddin et al. | |
| 2011/0244331 A1 | 10/2011 | Karthikeyan et al. | |
| 2012/0105007 A1 | 5/2012 | Amiruddin et al. | |
| 2012/0107680 A1 | 5/2012 | Amiruddin et al. | |

FOREIGN PATENT DOCUMENTS

| | | |
|---|---|---|
| JP | 09-045373 | 2/1997 |
| JP | 10-255837 | 9/1998 |
| JP | 2000-012018 | 1/2000 |
| JP | 2002-110167 | 4/2002 |
| JP | 2003-223887 | 8/2003 |
| JP | 2003-242978 A | 8/2003 |
| JP | 2005-251684 A | 9/2005 |
| JP | 2005289700 A | 10/2005 |
| JP | 2007-066667 A | 3/2007 |
| JP | 2008536285 A | 9/2008 |
| JP | 2009152114 A | 7/2009 |
| KR | 1020010043360 A | 5/2001 |
| KR | 1020030007651 A | 1/2003 |
| WO | 01/35473 A1 | 5/2001 |
| WO | 01/91209 A1 | 11/2001 |
| WO | 03/021697 A2 | 3/2003 |
| WO | 2004/084330 A2 | 9/2004 |
| WO | 2005/083829 A2 | 9/2005 |
| WO | 2006/109930 A1 | 10/2006 |
| WO | 2006/137673 A1 | 12/2006 |
| WO | 2008/086041 A1 | 7/2008 |
| WO | 2009/022848 A1 | 2/2009 |
| WO | 2009/128879 A2 | 10/2009 |

OTHER PUBLICATIONS

Kang et al., "Enchanting the rate capability of high capacity xLi2Mn03 . (1-x)LiMO2 (M=Mn, Ni, Co) electrodes by Li—Ni—PO4 treatment," Electrochemistry Communications 11 (2009) 748-751.

Kang et al., "Layered Li(Li0.2Ni0.15+0.5zCo0.10Mn0.55-0.5z)O2-zFz cathode materials for Li-ion secondary batteries," Journal of Power Sources 146 (2005) 654-657.

Kim et al., "Synthesis of spherical Li[Ni(1/3-z)Co(1/3-z)Mn 1/3-z)Mgz]O2 as positive electrode material for lithium ion battery," Electrchemica Acta 51 (2006) 2447-2453.

Kim et al., "Improvement of High-Voltage Cycling Behavior of Surface Modified Li[Ni1/3Co1/3Mn1/3]O2 Cathodes by Fluorine Substitution for Li-Ion Batteries," Journal of the Electrochemical Society 152 (9) A1701-A1713 (2005).

(56) References Cited

OTHER PUBLICATIONS

Lee et al., "High capacity Li[Li0.2Ni0.2Mn0.6]O2 cathode materials via a carbonate co-precipitation method," J. of Power Sources, 162 (2006), 1346-1350.

Sun et al., "AlF3-Coating to Improve High Voltage Cycling Performance of Li[Ni1/3Co1/3Mn1/3]O2 Cathode Materials for Lithium Secondary Batteries," J. of the Electrochemical Society, 154 (3), A168-A172 (2007).

Sun et al., "Significant Improvement of high voltage cycling behavior AlF3-coated LiCoO2 cathode," Electrochemistry Communications 8 (2006) 821-826.

Sun et al., "The preparation and electrochemical performance of solid solutions LiCoO2—Li2MnO3 as cathode materials for lithium ion batteries," J of Power Sources 159 (2006) 1353-1359.

Thackeray et al., "Comments on the structural complexity of lithium-rich Li1+xM1—xO2 electrodes (M=Mn,Ni,Co) for lithium batteries," Electrochemistry Communications 8 (2006), 1531-1538.

Woo et al., "Significant Improvement of Electrochemical Performance of AlF3-Coated Li[Ni0.8Co0.1Mn0.1]O2 Cathode Materials," J. of the Electrochemical Society, 154 (11) A1005-A1009 (2007).

Wu et al., "High Capacity, Surface-Modified Layered Li[Li(1-x)/3Mn(2-x)/3Nix/3Cox/3]O2 Cathodes with Low Irreversible Capacity Loss," Electrochemical and Solid State Letters, 9 (5) A221-A224 (2006).

Park et al., "Physical and electrochemical properties of spherical Li1+x(Ni1/3Co1/3Mn1/3)1-xO2 cathode materials", Journal of Power Sources, 177:177-183 (2008).

Song et al., Two-and three-electrode impedance spectroscopy of lithium-ion batteries, Journal of Power Sources 111 (2002) 255-267.

Thackeray et al., "Li2MnO3—stabilized LiMO2 (M = Mn, Ni, Co) electrodes for lithium-ion batteries," J. Mater. Chem., 2007; 17:3112-3125.

"Battery Test Manual for Plug-In Hybrid Elelctric Vehicles," prepared for the U.S. Department of Energy, Office of Energy Efficiency and Renewable Energy, Vehicle Technologies Program, 2008.

Search Report and Written Opinion for International Application No. PCT/US2010/042868, dated Feb. 25, 2011.

Liu et al., "Effect of electrolyte additives in improving the cycle and calendar life of graphite/Li1.1[Ni1/3Co1/3Mn1/3]0.9O2 Li-ion cells," Journal of Power Sources 174:852-855 (2007).

Search Report dated Jan. 27, 2014 for co-pending European application No. 10802887 dated Jan. 27, 2014 (7 pages).

Japanese Office Action from corresponding Japanese Patent Application No. 2012-521777 dated May 27, 2014.

\* cited by examiner

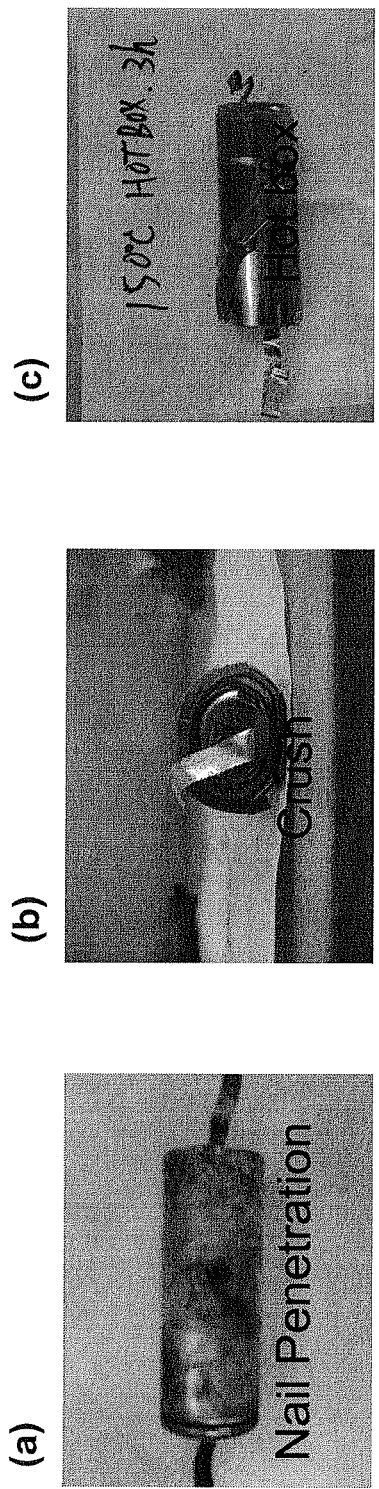

LITHIUM ION BATTERIES WITH LONG CYCLING PERFORMANCE

FIELD OF THE INVENTION

The invention relates to lithium secondary batteries that provide high specific discharge capacities and long cycling lives. Furthermore, the invention relates to high specific discharge capacity positive electrode compositions and method of making the compositions. In general, the positive electrode materials and compositions have high specific capacity with a layered structure.

BACKGROUND OF THE INVENTION

Lithium batteries are widely used in consumer electronics due to their relatively high energy density. Rechargeable batteries are also referred to as secondary batteries, and lithium ion secondary batteries generally have a negative electrode material that intercalates lithium. For some current commercial batteries, the negative electrode material can be graphite, and the positive electrode material can comprise lithium cobalt oxide ($LiCoO_2$). In practice, only roughly 50% of the theoretical capacity of the cathode can be used, e.g., roughly 140 mAh/g. At least two other lithium-based cathode materials are also currently in commercial use. These two materials are $LiMn_2O_4$, having a spinel structure, and $LiFePO_4$, having an olivine structure. These other materials have not provided any significant improvements in energy density.

Lithium ion batteries are generally classified into two categories based on their application. The first category involves high power battery, whereby lithium ion battery cells are designed to deliver high current (Amperes) for such applications as power tools and Hybrid Electric Vehicles (HEVs). However, by design, these battery cells are lower in energy since a design providing for high current generally reduces total energy that can be delivered from the battery. The second design category involves high energy batteries, whereby lithium ion battery cells are designed to deliver low to moderate current (Amperes) for such applications as cellular phones, lap-top computers, Electric Vehicles (EVs) and Plug in Hybrid Electric Vehicles (PHEVs) with the delivery of higher total capacity.

SUMMARY OF THE INVENTION

In a first aspect, the invention pertains to a battery comprising a negative electrode, a positive electrode, a separator between the negative electrode and the positive electrode, and a non-aqueous electrolyte comprising lithium ions. The negative electrode of the battery comprises graphite and the positive electrode comprises a lithium intercalation composition. The battery has a room temperature fifth cycle discharge specific energy of at least about 175 Wh/kg discharged at a C/3 discharge rate from 4.2V to 2.5V. Additionally, the battery maintains at least about 70% discharge capacity at 1000 cycles relative to the fifth cycle, with the battery being discharged from 4.2V to 2.5V at a C/2 rate from the fifth cycle through the 1000th cycle. In some embodiments, the lithium intercalation composition for the positive electrode can comprise a lithium rich layered lithium metal oxide.

In some embodiments, the lithium intercalation composition can be approximately represented by the formula $Li_{1+x}[Mn_{0.333}Ni_{0.333}Co_{0.333}]_{1-x}O_2$, wherein x is between about 0.05 and 0.3. In additional or alternative embodiments, the lithium intercalation composition is approximately represented by the formula $Li_{1.2}Ni_{0.15}Mn_{0.55}Co_{0.10}O_2$. The lithium intercalation composition of the positive electrode can have a coating comprising a metal fluoride. Also, the electrolyte of the battery can comprise a stabilizing additive.

In some embodiments, the battery comprises a cylindrical metal case. In another embodiment, the battery has a foil case and a prismatic shape to form a prismatic battery. The prismatic battery can have a room temperature fifth cycle discharge specific energy of at least about 195 Wh/kg discharged at a C/3 rate from 4.2V to 2.5V. In some embodiments, the battery can maintain at least about 70% discharge capacity at 1100 cycles relative to the fifth cycle, with the battery being discharged from 4.2V to 2.5V at a C/2 rate from the fifth cycle through the 1100th cycle. Furthermore, the battery can have a room temperature fifth cycle energy density of at least about 425 Wh/L discharged at a C/3 rate from 4.2V to 2.5V.

In another aspect, the invention pertains to a battery comprising a negative electrode, a positive electrode, a separator between the negative electrode and the positive electrode, and a non-aqueous electrolyte comprising lithium ions. The negative electrode of the battery comprises graphite, and the positive electrode comprises a lithium intercalation composition comprising a lithium rich layered lithium metal oxide. The battery can have a room temperature fifth cycle discharge specific energy of at least about 175 Wh/kg discharged at C/3 rate from 4.2V to 2.5V and the battery maintains at least about 70% discharge capacity at 600 cycles relative to the fifth cycle, with the battery being discharged from 4.2V to 2.5V at a C/2 rate from the fifth cycle through the 600th cycle.

In some embodiments, the lithium rich layered lithium metal oxide is represented by the formula $Li_{1+x}Ni_\alpha Mn_\beta Co_\gamma O_2$, where x ranges from about 0.05 to about 0.25, α ranges from about 0.1 to about 0.4, β range from about 0.3 to about 0.65, and γ ranges from about 0.05 to about 0.4. In additional embodiments, the lithium rich layered lithium metal oxide is approximately represented by the formula $Li_{1+x}[Mn_{0.333}Ni_{0.333}Co_{0.333}]_{1-x}O_2$, wherein x ranges between about 0.05 and 0.3. The lithium rich layered lithium metal oxide of the positive electrode can have a coating comprising a metal fluoride, and the electrolyte can comprise a stabilizing additive. In some embodiments, the battery maintains at least about 70% discharge capacity at 850 cycles relative to the fifth cycle, with the battery being discharged at a C/2 rate from 4.2V to 2.5V from the fifth cycle through the 850th cycle.

In a further aspect, the invention pertains to an electric vehicle comprising an electric motor, a drive train comprising wheels mounted on axles driven by the electric motor, a passenger compartment comprising seats and controls. The passenger compartment of the electric vehicle is supported at least in part by the drive train and the electric motor is powered by an electrical power pack comprising a plurality of lithium ion batteries. The electrical power pack can provide at least about 40 kWh of power, can have a volume of no more than about 128 liters, and can maintain at least about 70% discharge capacity at 1000 cycles relative to the fifth cycle, with the battery being discharged at a C/2 rate from 4.2V to 2.5V from the fifth cycle through the 1000th cycle at room temperature. In some embodiments, a plurality of lithium ion batteries in the electrical power pack comprises cylindrical 26700 cells. In another embodiment, the plurality of lithium ion batteries can comprise prismatic shaped batteries with a polymer pouch casing. In some embodiments, the plurality of lithium ion batteries of the power pack comprises positive electrodes comprising an active composition represented by the formula $Li_{1+x}Ni_\alpha Mn_\beta Co_\gamma O_2$, where x ranges from about 0.05 to about 0.25, α ranges from about 0.1 to about 0.4, β range from about 0.3 to about 0.65, and γ ranges from about 0.05 to about 0.4. In some embodiments, the active composition of the positive electrode can have a coating comprising a metal fluoride, and the plurality of lithium ion batteries can comprise an electrolyte which comprises a stabilizing additive.

BRIEF DESCRIPTION OF THE DRAWINGS

FIG. 14 is a set of photos of the cylindrical batteries of Example 4 subjected to abuse tests (a) nail penetration test; (b) crush test; and (c) hot box test: in 150° C. hotbox for 3 hours.

DETAILED DESCRIPTION OF THE INVENTIONS

Figure 1:
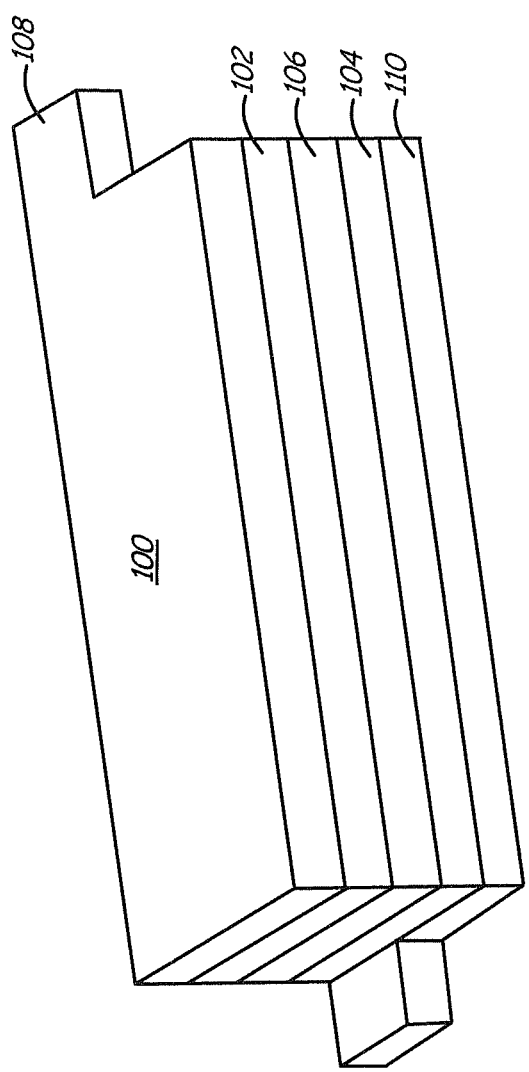
FIG. 1 is a schematic drawing of a battery structure separated from a container.

Lithium ion batteries described herein combine features that result in improved performance upon a large number of charging and discharging cycles. In particular, the batteries have outstanding cycling performance such that the battery exhibit deep discharge cycling up over 1000 cycles while maintaining appropriate levels of performance. The batteries described herein are particularly suitable for use in vehicles with electric motors, such as hybrid vehicles, plug-in hybrids and electric vehicles. The ability to maintain performance over a large number of discharge-recharge cycles can greatly increase the practical nature of vehicles with electric motors since then battery packs do not need to be replaced as often. Since battery packs can have a significant cost, by extending the cycle life of the batteries, the cost for use of the vehicles with electric motors can be correspondingly reduced over the life of the vehicle. In addition, the batteries described herein have a relatively high capacity. Based on a relatively high capacity the volume and weight of a battery pack for a vehicle can be reduced without diminishing the range of the vehicle between charges or the range of the vehicle can be extended based on particular parameters of the battery pack. These desirable performance characteristics can be exploited in other battery applications also.

Lithium ion batteries described herein have achieved improved cycling performance while exhibiting high specific capacity and high overall capacity. High capacity positive electrode materials for the long cycle life batteries described herein can be produced using techniques that are scalable for commercial production. Suitable synthesis techniques include, for example, co-precipitation approaches or sol-gel synthesis. Use of a metal fluoride coating or other suitable coatings provides enhanced cycling performance. The positive electrode materials also exhibit a high average voltage over a discharge cycle so that the batteries have high power output along with a high specific capacity. As a result of a relatively high tap density and excellent cycling performance, the battery exhibit continuing high total capacity when cycled. Furthermore, the positive electrode materials demonstrate a reduced proportion of irreversible capacity loss after the first charge and discharge of the battery so that negative electrode material can be correspondingly reduced. The combination of excellent cycling performance, high specific capacity, and high overall capacity make these resulting lithium ion batteries an improved power source, particularly for high energy applications, such as electric vehicles, plug-in hybrid vehicles and the like.

The batteries described herein are lithium ion batteries in which a non-aqueous electrolyte solution comprises lithium ions. For secondary lithium ion batteries, lithium ions are released from the negative electrode during discharge such that the negative electrode functions as an anode during discharge with the generation of electrons from the oxidation of lithium upon its release from the electrode. Correspondingly, the positive electrode takes up lithium ions through intercalation or a similar process during discharge such that the positive electrode functions as a cathode which consumes electrons during discharge. Upon recharging of the secondary battery, the flow of lithium ions is reversed through the battery with the negative electrode taking up lithium and with the positive electrode releasing lithium as lithium ions.

The word "element" is used herein in its conventional way as referring to a member of the periodic table in which the element has the appropriate oxidation state if the element is in a composition and in which the element is in its elemental form, $M^0$, only when stated to be in an elemental form. Therefore, a metal element generally is only in a metallic state in its elemental form or a corresponding alloy of the metal's elemental form. In other words, a metal oxide or other metal composition, other than metal alloys, generally is not metallic.

In some embodiments, the lithium ion batteries can use a positive electrode active material that is lithium rich relative to a reference homogenous electroactive lithium metal oxide composition. While not wanted to be limited by theory, it is believed that appropriately formed lithium-rich lithium metal oxides have a composite crystal structure. For example, in some embodiments of lithium rich materials, a $Li_2MnO_3$ material may be structurally integrated with either a layered $LiMnO_2$ component or similar composite compositions with the manganese cations substituted with other transition metal cations with appropriate oxidation states. In some embodiments, the positive electrode material can be represented in two component notation as x $Li_2MnO_3 \cdot (1-x)LiM'O_2$ where M' is one or more metal cations with an average valance of +3 with at least one cation being $Mn^{+3}$ or $Ni^{+3}$ and where M is one or more metal cations with an average valance of +4. These compositions are described further, for example, in U.S. Pat. No. 6,680,143 to Thackeray et al., entitled "Lithium Metal Oxide Electrodes for Lithium Cells and Batteries," incorporated herein by reference. Positive electrode active materials of particular interest have a formula $Li_{1+x}Ni_\alpha Mn_\beta Co_\gamma M_\delta O_2$, where x ranges from about 0.05 to about 0.25, $\alpha$ ranges from about 0.1 to about 0.4, $\beta$ range from about 0.3 to about 0.65, $\gamma$ ranges from about 0.05 to about 0.4, and $\delta$ ranges from about 0 to about 0.1, and where M is Mg, Zn, Al, Ga, B, Zr, Ti, Ca, Ce, Y, Nb or combinations thereof. A person of ordinary skill in the art will recognize that additional ranges of parameters within these explicit ranges are contemplated and are within the present disclosure.

In the examples below, surprisingly good cycling performance with high capacity is obtained with $Li_{1.2}[Ni_{0.333}Co_{0.333}Mn_{0.333}]O_2$. Furthermore, surprisingly large capacities have been obtained for $Li[Li_{0.2}Ni_{0.175}Co_{0.10}Mn_{0.525}]O_2$, as presented in copending U.S. patent application Ser. No. 12/332,735, now U.S. Pat. No. 8,465,873, to Lopez et al. (the '735 application) entitled "Positive Electrode Material for High Specific Discharge Capacity Lithium Ion Batteries", incorporated herein by reference. The materials in the '735 application were synthesized using a carbonate co-precipitation process. Also, very high specific capacities were obtained for this composition using hydroxide co-precipitation and sol gel synthesis approaches as described in U.S. application Ser. No. 12/246,814, now U.S. Pat. No. 8,389,160, to Venkatachalam et al. (the '814 application) entitled "Positive Electrode Material for Lithium Ion Batteries Having a High Specific Discharge Capacity and Processes for the Synthesis of these Materials", incorporated herein by reference. These compositions have a low risk of fire for improved safety properties due to their specific compositions with a layered structure and reduced amounts of nickel relative to some other high capacity cathode materials. These compositions use low amounts of elements that are less desirable from an environmental perspective, and can be produced from starting materials that have reasonable cost for commercial scale production.

Co-precipitation processes have been performed for the desired lithium rich metal oxide materials, and the resulting materials exhibit improved performance characteristics when incorporated into the battery formats described herein. In addition to the high specific activity, the materials exhibit superior tap density which leads to high overall capacity of the material in fixed volume applications. As demonstrated in the examples below, the lithium rich metal oxide materials formed with the co-precipitation processes have excellent performance properties that can be incorporated into improved batteries.

The materials described herein also exhibit a large tap density. In general, when specific capacities are comparable, a larger tap density of a positive electrode material results in a higher overall capacity of a battery. The large tap density also can result in a large specific energy and specific power. Generally, a battery with a larger capacity can provide for longer discharge times for a specific application. Thus, these batteries can exhibit improved performance. It is important to note that during charge/discharge measurements, the specific capacity of a material depends on the rate of discharge. The maximum specific capacity of a particular material is measured at very slow discharge rates. In actual use, the actual specific capacity is less than the maximum due to discharge at a finite rate. More realistic specific capacities can be measured using reasonable rates of discharge that are more similar to the rates during use. For low to moderate rate applications, a reasonable testing rate involves a discharge of the battery over three hours. In conventional notation this is written as C/3 or 0.33 C.

When the corresponding batteries with the intercalation-based positive electrode active materials are in use, the intercalation and release of lithium ions from the lattice induces changes in the crystalline lattice of the electroactive material. As long as these changes are essentially reversible, the capacity of the material does not change. However, the capacity of the active materials is observed to decrease with cycling to varying degrees. Thus, after a number of cycles, the performance of the battery falls below acceptable values, and the battery is replaced. Also, on the first cycle of the battery, generally there is an irreversible capacity loss that is significantly greater than per cycle capacity loss at subsequent cycles. The irreversible capacity loss is the difference between the charge capacity of the new battery and the first discharge capacity. To compensate for this first cycle irreversible capacity loss, extra electroactive material is included in the negative electrode such that the battery can be fully charged even though this lost capacity is not accessible during most of the life of the battery so that negative electrode material is essentially wasted. The bulk of the first cycle irreversible capacity loss is generally attributed to the positive electrode material.

Appropriate coating materials can both improve the long term cycling performance of the material as well as decrease the first cycle irreversible capacity loss. While not wanting to be limited by theory, the coatings may stabilize the crystal lattice during the uptake and release of lithium ions so that irreversible changes in the crystal lattice are reduced significantly. In particular, metal fluoride compositions can be used as effective coatings. The general use of metal fluoride compositions as coatings for cathode active materials, specifically $LiCoO_2$ and $LiMn_2O_4$, is described in published PCT application WO 2006/109930A to Sun et al., entitled "Cathode Active Material Coated with Fluorine Compound for Lithium Secondary Batteries and Method for Preparing the Same," incorporated herein by reference.

It has been discovered that metal fluoride coatings can provide significant improvements for lithium rich layered positive electrode active materials. These improvements relate to long term cycling with significantly reduced degradation of capacity, a significant decrease in first cycle irreversible capacity loss and an improvement in the capacity generally. Since the coating materials are inactive in the cell cycling, it is surprising that the coating materials can increase the active materials specific capacities. The amount of coating material can be selected to accentuate the observed performance improvements. The improvements of coating materials for lithium rich positive electrode active materials are described further in the '735 application and the '814 application.

The cycling performance depends on the depth of the discharge. In particular, a deeper discharge generally results in a significant decrease in cycling performance. In the results described herein, the cells are cycled in a deep discharge close to 100% of total capacity. Generally, the term used is depth-of-discharge or DOD, which refers to the portion of the battery capacity that is referenced during the cell cycling. With respect to the improved cells described herein, the cells initially have a large capacity and this capacity is maintained well during long term cycling. Good cycling for lower capacity positive electrode materials that are cycled at 80% DOD are described in U.S. Pat. No. 7,507,503 to Amine et al. (the '503 patent), entitled "Long Life Lithium Batteries with Stabilized Electrodes," incorporated herein by reference. The '503 patent describes stable long term cycling for lithium manganese oxide spinel compositions and carbon-coated olivine metal phosphates.

The results described herein are based on the discovery of a synergy between several different approaches that provide for batteries with excellent capacities with respect to current, power and energy as well as excellent cycling out to 1000 cycles with a DOD close to 100%. In particular, the batteries generally comprise a lithium rich positive electrode material, which can provide for large capacities, in particular when based on synthesis approaches that have been developed. A metal fluoride coating provides stabilization with respect to cycling and a decrease in first cycle irreversible capacity loss while maintaining or increasing the capacity of the material. Also, stabilizing additives for the electrolyte provide further synergistic improvement in the cycling performance. Thus, the outstanding performance described herein results from the synergistic combination of features that provides for an outstanding battery that can provide significantly improved performance, especially for electric vehicle applications.

In general, as a result of the synergistic improvements in the battery performance, the batteries of particular interest herein exhibit a cycle life in which the battery retains at least about 70% of its capacity after 1000 cycles relative to cycle 5 at a C/2 discharge rate from cycle 5 to cycle 1000 with a DOD of at least 95%. These cycling results can be obtained along with large specific energies. For example, in some embodiments, the room temperature discharge specific energy can be at least about 175 Wh/kg at a C/3 rate from 4.2 V to 2.5 V. For many applications, the batteries are intended to operate over a range of temperatures, and the batteries should correspondingly maintain reasonable performance over these temperature ranges. In some embodiments, the batteries have a specific energy of at least about 135 Wh/kg when discharged at a C/3 rate from 4.2 V to 2.5V over a temperature range from −20° C. to 45° C.

Rechargeable batteries have a range of uses, such as mobile communication devices, such as phones, mobile entertainment devices, such as MP3 players and televisions, portable computers, combinations of these devices that are finding wide use, as well as transportation devices, such as automobiles and fork lifts. Most of the batteries used in these electronic devices have a fixed volume. It is therefore highly desirable that the positive electrode material used in these batteries has a high tap density so there is essentially more chargeable material in the positive electrode yielding a higher total capacity of the battery. The batteries described herein that incorporate improved positive electrode active materials with respect to specific capacity, tap density, and cycling can provide improved performance for consumers, especially for medium current applications.

The batteries described herein are suitable for vehicle applications. In particular, these batteries can be used in battery packs for hybrid vehicles, plug-in hybrid vehicles and purely electric vehicles. These vehicles generally have a battery pack that is selected to balance weight, volume and capacity. While larger battery packs can provide a greater range on electric operation, larger packs take up more room that is then not available for other purposes and have greater weight that can decrease performance. Thus, due to the high capacity of the batteries described herein, a battery pack that yields a desired amount of total power can be made in a reasonable volume, and these battery packs can correspondingly achieve the excellent cycling performance described herein. In some embodiments, a power pack can provide at least about 40 kWh of power with a volume of no more than about 128 liters.

Battery Structure

The batteries of particular interest herein are lithium ion batteries in which generally a non-aqueous electrolyte comprises lithium ions. For secondary lithium ion batteries, lithium ions are released from the negative electrode during discharge such that the negative electrode functions as an anode during discharge with the generation of electrons from the oxidation of lithium upon its release from the electrode. Correspondingly, the positive electrode takes up lithium ions through intercalation or other mechanism during discharge such that the positive electrode functions as a cathode which neutralizes the lithium ions with the consumption of electrons. Upon recharging of the secondary cell, the flow of lithium ions is reversed through the cell with the negative electrode taking up lithium and with the positive electrode releasing lithium as lithium ions.

The batteries described herein comprise combinations of features that provide synergistic improvement with respect to overall battery performance. In particular, battery performance can be evaluated with respect to parameters that are significant for electric vehicle uses of the batteries. For these applications, the cycle life of the batteries is important because the replacement of a battery pack is a significant expense. Also, the energy density of the battery is significant since a lighter weight battery pack is desirable if the battery pack can deliver the same capacity. Furthermore, the batteries described herein provide excellent volumetric performance, which is facilitated by a large tap density and large loading levels for the positive electrode materials. As described herein, the desirable battery performance is achieved through the use of high energy density positive electrode active materials synthesized with processes that result in particularly desirable material properties. The positive electrode active materials can be coated to stabilize the cycling of the materials. Additives in the electrolyte can further stabilize the cycling of the batteries. Also, the properties of the positive electrode active materials can result in a high tap density that correspondingly results in a high loading of active materials in the electrode.

Lithium has been used in both primary and secondary batteries. An attractive feature of lithium metal is its light weight and the fact that it is the most electropositive metal, and aspects of these features can be advantageously captured in lithium ion batteries also. Certain forms of metals, metal oxides, and carbon materials are known to incorporate lithium ions into its structure through intercalation, alloying or similar mechanisms. Desirable mixed metal oxides are described further herein to function as electroactive materials for positive electrodes in secondary lithium ion batteries. Lithium ion batteries refer to batteries in which the negative electrode active material is also a lithium intercalation or alloying material. If lithium metal itself is used as the anode, the resulting battery generally is simply referred to as a lithium battery.

The composition of the positive electrode active material and negative electrode active material influences the resulting voltage of the battery since the voltage is the difference between the half cell potentials at the cathode and anode. Suitable negative electrode lithium intercalation or alloying compositions can include, for example, graphite, synthetic graphite, coke, fullerenes, niobium pentoxide, tin alloys, silicon, titanium oxide, tin oxide, and lithium titanium oxide, such as $Li_xTiO_2$, $0.5<x\le1$ or $Li_{1+x}Ti_{2-x}O_4$, $0\le x\le 1/3$. Additional negative electrode materials are described in copending U.S. patent application Ser. No. 12/502,609 to Kumar filed on Jul. 14, 2009, entitled "Composite Compositions, Negative Electrodes with Composite Compositions and Corresponding Batteries," and U.S. patent application Ser. No. 12/429,438, now U.S. Pat. No. 8,277,974, to Kumar et al., entitled "Lithium Ion Batteries with Particular Negative Electrode Compositions," both of which are incorporated herein by reference.

However, with respect to the excellent cycling properties described herein, generally the carbon materials, e.g., graphite, synthetic graphite, coke and/or fullerenes, and lithium titanium oxide are expected to be able to achieve desired long term cycling. Batteries with lithium titanate anode generally operate at a relatively low voltage, so that these materials are expected to result in low energy density batteries. Thus, for the long cycling, high energy density batteries of particular interest, the negative electrodes generally comprise an active carbon material, such as graphite, synthetic graphite, coke, fullerenes, carbon nanotubes or other graphitic carbon. Graphitic carbon generally comprises graphene sheets of $sp^2$ bonded carbon atoms. For convenience, as used herein graphitic carbon refers generally to an elemental carbon material comprising substantial domains of graphene sheets.

The positive electrode active compositions and negative electrode active compositions generally are powder compositions that are held together in the respective electrodes with a polymer binder. The binder allows for ionic conductivity to the active particles when in contact with the electrolyte. Suitable polymer binders include, for example, polyvinylidine fluoride, polyethylene oxide, polyethylene, polypropylene, polytetrafluoroethylene, polyacrylates, rubbers, e.g. ethylene-propylene-diene monomer (EPDM) rubber ethylene-(propylene-diene monomer) copolymer (EPDM) or styrene butadiene rubber (SBR), copolymers thereof, or mixtures thereof.

The active particle loading in the binder can be large, such as greater than about 80 weight percent, in further embodiments at least about 83 weight percent and in other embodiments from about 85 to about 97 weight percent active material. A person of ordinary skill in the art will recognize that additional ranges of particle loadings within the explicit ranges above are contemplated and are within the present disclosure. To form the electrode, the powders can be blended with the polymer in a suitable liquid, such as a solvent for the polymer. The resulting paste can be pressed into the electrode structure.

The positive electrode composition, and in some embodiments the negative electrode composition, generally also comprises an electrically conductive powder distinct from the electroactive composition. Suitable supplemental electrically conductive powders include, for example, graphite, carbon black, metal powders, such as silver powders, metal fibers, such as stainless steel fibers, and the like, and combinations thereof. Generally, a positive electrode can comprise from about 1 weight percent to about 25 weight percent, in further embodiments from about 1.5 weight percent to about 20 weight percent and in other embodiments from about 2 weight percent to about 15 weight percent distinct electrically conductive powder. A person of ordinary skill in the art will recognize that additional ranges of amounts of electrically conductive powders within the explicit ranges above are contemplated and are within the present disclosure.

The electrode generally is associated with an electrically conductive current collector to facilitate the flow of electrons between the electrode and an exterior circuit. The current collector can comprise metal, such as a metal foil or a metal grid. In some embodiments, the current collector can be formed from nickel, aluminum, stainless steel, copper or the like. The electrode material can be cast as a thin film onto the current collector. The electrode material with the current collector can then be dried, for example in an oven, to remove solvent from the electrode. In some embodiments, the dried electrode material in contact with the current collector foil or other structure can be subjected to a pressure, such as from about 2 to about 10 kg/cm$^2$ (kilograms per square centimeter), to form an electrode structure for assembly into the battery.

A separator can be located between the positive electrode and the negative electrode. The separator is electrically insulating while providing for at least selected ion conduction between the two electrodes. A variety of materials can be used as separators. Commercial separator materials are generally formed from polymers, such as polyethylene and/or polypropylene that are porous sheets that provide for ionic conduction. Commercial polymer separators include, for example, the Celgard® line of separator material from Hoechst Celanese, Charlotte, N.C. Suitable separator materials include, for example, 12 micron to 40 micron thick trilayer polypropylene-polyethylene-polypropylene sheets, such as Celgard® M824, which has a thickness of 12 microns. Also, ceramic-polymer composite materials have been developed for separator applications. These composite separators can be stable at higher temperatures, and the composite materials can significantly reduce the fire risk. The polymer-ceramic composites for separator materials are described further in U.S. patent application 2005/0031942A, now U.S. Pat. No. 7,351,494, to Hennige et al., entitled "Electric Separator, Method for Producing the Same and the Use Thereof," incorporated herein by reference. Polymer-ceramic composites for lithium ion battery separators are sold under the trademark Separion® by Evonik Industries, Germany.

Electrolytes for lithium ion batteries can comprise one or more selected lithium salts. Appropriate lithium salts generally have inert anions. Suitable lithium salts include, for example, lithium hexafluorophosphate, lithium hexafluoroarsenate, lithium bis(trifluoromethyl sulfonyl imide), lithium trifluoromethane sulfonate, lithium tris(trifluoromethyl sulfonyl)methide, lithium tetrafluoroborate, lithium perchlorate, lithium tetrachloroaluminate, lithium chloride and combinations thereof. In some embodiments, the electrolyte comprises a 1 M concentration of the lithium salts, although other larger and smaller concentrations can be used.

For lithium ion batteries of particular interest, a non-aqueous liquid is generally used to dissolve the lithium salt(s). The solvent is generally inert and does not dissolve the electroactive materials. Appropriate solvents include, for example, propylene carbonate, dimethyl carbonate, diethyl carbonate, 2-methyl tetrahydrofuran, dioxolane, tetrahydrofuran, methyl ethyl carbonate, γ-butyrolactone, dimethyl sulfoxide, acetonitrile, formamide, dimethyl formamide, triglyme (tri(ethylene glycol) dimethyl ether), diglyme (diethylene glycol dimethyl ether), DME (glyme or 1,2-dimethyloxyethane or ethylene glycol dimethyl ether), nitromethane and mixtures thereof. It has been found that additives in the electrolyte can further stabilize the cycling of the battery, and these additives are described in detail in the following section.

The electrodes described herein can be incorporated into various commercial battery designs. For example, the cathode compositions can be used for prismatic shaped batteries, wound cylindrical batteries, coin batteries or other reasonable battery shapes. The batteries can comprise a single cathode structure or a plurality of cathode structures assembled in parallel and/or series electrical connection(s). While the positive electrode active materials can be used in batteries for primary, or single charge use, the resulting batteries generally have desirable cycling properties for secondary battery use over multiple cycling of the batteries.

In some embodiments, the positive electrode and negative electrode can be stacked with the separator between them, and the resulting stacked structure can be rolled into a cylindrical or prismatic configuration to form the battery structure. Appropriate electrically conductive tabs can be welded or the like to the current collectors, and the resulting jellyroll structure can be placed, for example, into a metal canister or polymer package, with the negative tab and positive tab welded to appropriate external contacts. Electrolyte is added to the enclosure, and the enclosure is sealed to complete the battery. Some presently used rechargeable commercial batteries include, for example, the cylindrical 18650 batteries (18 mm in diameter and 65 mm long) and 26700 batteries (26 mm in diameter and 70 min long), although other battery sizes can be used.

Referring to FIG. 1, a battery 100 is shown schematically having a negative electrode 102, a positive electrode 104 and a separator 106 between negative electrode 102 and positive electrode 104. A battery can comprise multiple positive electrodes and multiple negative electrodes, such as in a stack, with appropriately placed separators. Electrolyte in contact with the electrodes provides ionic conductivity through the separator between electrodes of opposite polarity. A battery generally comprises current collectors 108, 110 associated respectively with negative electrode 102 and positive electrode 104.

Additives

The selection of the electrolyte itself or additives to the electrolyte can further influence the cycling stability of the battery. In particular, the selection of the electrolyte itself and/or the inclusion of an additive can improve the cycling stability, and this improvement in stability can provide synergistic improvement in combination with coated positive electrode materials. As described herein, these selections of electrolyte additives can be combined with the inclusion of electroactive materials with excellent properties with respect to energy density, other capacity parameters as well as cycling to result in remarkable performance properties. In particular, the electrolyte should be stable both with respect to resisting chemical changes over the passage of time as well as resisting chemical degradation as a result of the electrochemical reactions in the cell. Furthermore, desirable additives or electrolyte compositions can further stabilize the electroactive materials during cycling.

Some common lithium salts for lithium ion battery electrolytes are described above. A class of alternative electrolytes is described in U.S. Pat. No. 6,783,896 to Tsujioka et al. ("the '896 patent"), entitled "Electrolyte for Electrochemical Device," incorporated herein by reference. These alternative electrolytes are also described as potential electrolyte additives. In particular, the alternative electrolytes in the '896 patent are ionic metal complexes formed as lithium salts for the formation of a lithium-based electrolyte with

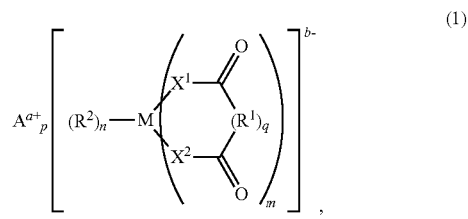

(1)

where a is a number from 1 to 3, b is a number from 1 to 3, p=b/a, m is a number from 1 to 4, n is a number from 1 to 8, q is 0 or 1, M is a transition metal or an element selected from groups 13-15 of the periodic table, $A^{a+}$ is a metal ion, onium ion or a hydrogen ion, $R^1$ is an organic group, $R^2$ is a halogen or an organic group, $X^1$ and $X^2$ are independently O, S or $NR^4$, and $R^4$ is a halogen or an organic group. Suitable organic groups for $R^1$, $R^2$ and $R^3$ are discussed further in '896 patent. Note that the '896 patent has an obvious error in their formulas with $A^{a+}$ incorrectly given as $A^{2+}$. Compositions of particular interest are represented by formulas where $A^{a+}$ is $Li^+$, the $R^2$ groups are halogen atoms and $X^1$ and $X^2$ are O atoms. The '896 patent exemplified $LiBF_2C_2O_4$ (lithium difluoro(oxalato)borate as an electrolyte or in an electrolyte blend.

Other lithium salts with anions based on metal complexes without a halogen are described further in U.S. Pat. No. 6,787,267 to Tsujioka et al. (the '267 patent), entitled "Electrolyte for Electrochemical Device," incorporated herein by reference. The '267 patent describes electrolytes represented by a formula:

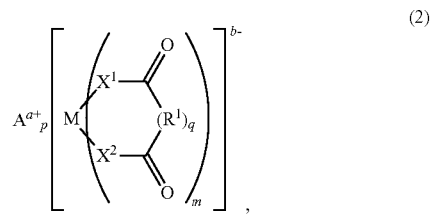

(2)

The same notation is used in formula (2) as is used for formula (1) above. One compound of interest within this genus is $LiB(C_2O_4)_2$, i.e. lithium bis(oxalato)borate. The combination of lithium bis(oxalato)borate with a solvent comprising a lactone is described further in U.S. Pat. No. 6,787,268 to Koike et al., entitled "Electrolyte," incorporated herein by reference.

Electrolyte additives for stabilizing cells based on spirocyclic hydrocarbons are described in U.S. Pat. No. 7,507,503 to Amine et al. ("the '503 patent"), entitled "Long Life Lithium Batteries with Stabilized Electrodes," incorporated herein by reference. The hydrocarbons contain at least one oxygen atom and at least one alkeneyl or alkynyl group. The spirocyclic additives of particular interest include compositions represented by the formula:

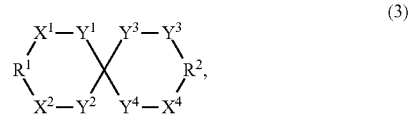
(3)

where $X^1$, $X^2$, $X^3$ and $X^4$ are independently O or $CR^3R^4$, provided that $X^1$ is not O when $Y^1$ is O, $X^2$ is not O when $Y^2$ is O, $X^3$ is not O when $Y^3$ is O and $X^4$ is not O when $Y^4$ is O; $Y^1$, $Y^2$, $Y^3$, and $Y^4$ are independently O or $CR^3R^4$; $R^1$ and $R^2$ are independently a substituted or unsubstituted divalent alkenyl or alkynyl group; and $R^3$ and $R^4$ are independently H, F, Cl, or an unsubstituted alkyl, alkenyl or alkynyl group. The '503 patent described the use of their additives with various lithium salts including, for example, conventional lithium salts. In addition, the '503 patent teaches the use of lithium(chelato)borates or lithium (chelato)phosphates either as the lithium metal salt or as an additive supplementing another lithium salt in the electrolyte. Specifically, the '503 patent describes $Li[(C_2O_4)_2B]$, $Li(C_2O_4)BF_2$ or $LiPF_2C_4O_8$ in concentrations from about 0.0005 to about 15 weight percent in the electrolyte. The '503 patent speculates that the additives protect the electrodes from chemical attack. Specifically, it is suggested in the '503 patent that the additives form a film on the electrodes that prevent non-lithium metal ions, such as $Mn^{+2}$ or $Fe^{+2}$, in the active materials from dissolving into the electrolyte.

The combination of lithium(chelato)borates as a first electrolyte additive and a second additive, which is a organo-amine, alkene, aryl compound or mixtures thereof, is described in published U.S. patent application 2005/0019670 to Amine et al., entitled "Long Life Lithium Batteries With Stabilized Electrodes," incorporated herein by reference. Hydrocarbon electrolyte additives that comprising at least one oxygen atom and at least one aryl, alkenyl or alkynl group are described in published U.S. patent application 2006/0147809 to Amine et al., entitled "Long Life Lithium Batteries With Stabilized Electrodes," incorporated herein by reference. Gas suppression additives for lithium ion cells based on unsaturated hydrocarbons generally in the electrolyte in concentrations from 0.1 to 10 weight percent are described in published U.S. patent application 2004/0151951 to Hyung et al. entitled "Lithium Based Electrochemical Cell Systems," incorporated herein by reference. Additives comprising lithium salts with heteroborate cluster anions are described in U.S. patent 2008/0026297 to Chen et al., entitled "Electrolytes, Cells and Methods of Forming Passivation Layers," incorporated herein reference.

Thus, the cycling improvement additives can be either lithium salts or other compositions. The lithium salts generally can supply all of the lithium ions for the electrolyte, or the stabilizing lithium salts can be combined with conventional lithium salts. In general, if the electrolyte comprises a blend of lithium salts including lithium salts corresponding to formulas (1) and (2) above, the total lithium salts can comprise from about 0.0005 to about 15 weight percent, and in further embodiments from about 0.01 to about 12 weight percent lithium salts corresponding to formulas (1) and (2) above. With respect to non-lithium salt stabilizing additives, such as additives represented by formula (3) above, the electrolyte can comprise from about 0.0005 to about 20 weight percent, in further embodiments from about 0.01 to about 15 weight percent and in additional embodiments form about 0.1 to about 10 weight percent additive. A person of ordinary skill in the art will recognize that other additive concentration ranges within the explicit ranges above are contemplated and are within the present disclosure.

Positive Electrode Active Materials

The positive electrode active materials comprise lithium intercalating metal oxide compositions. In some embodiments, the lithium metal oxide compositions can comprise lithium rich compositions that generally are believed to form a layered composite structure. The positive electrode active compositions can exhibit surprisingly high specific capacities and high tap densities in lithium ion battery cells under realistic discharge conditions. The desired electrode active materials can be synthesized using synthesis approaches described herein.

In some embodiments, the compositions can be described by the formula $Li_{1+x}Ni_\alpha Mn_\beta CO_\gamma M_\delta O_{2-z}F_z$, where x ranges from about 0.05 to about 0.25, α ranges from about 0.1 to about 0.4, β range from about 0.3 to about 0.65, γ ranges from about 0.05 to about 0.4, δ ranges from about 0 to about 0.1 and z ranges from about 0 to about 0.1, and where M is Mg, Zn, Al, Ga, B, Zr, Ti, Ca, Ce, Y, Nb or combinations thereof. A person of ordinary skill in the art will recognize that additional ranges of parameter values within the explicit ranges above are contemplated and are within the present disclosure. The fluorine is a dopant that can contribute to cycling stability as well as improved safety of the materials. In embodiments in which z=0, this formula reduces to $Li_{1+x}Ni_\alpha Mn_\beta CO_\gamma M_\delta O_2$. In further embodiments, the parameters have the ranges where x ranges from about 0.05 to about 0.25, α ranges from about 0.1 to about 0.4, β range from about 0.4 to about 0.65, γ ranges from about 0.05 to about 0.3, and δ ranges from about 0 to about 0.1.

Kang and coworkers have described a composition for use in secondary batteries with the formula $Li_{1+x}Ni_\alpha Mn_\beta Co_\gamma M'_\delta O_{2-z}F_z$, M'=Mg, Zn, Al, Ga, B, Zr, Ti, x between about 0 and 0.3, α between about 0.2 and 0.6, β between about 0.2 and 0.6, γ between about 0 and 0.3, δ between about 0 and 0.15 and z between about 0 and 0.2. The metal ranges and fluorine were proposed as improving battery capacity and stability of the resulting layered structure during electrochemical cycling. See U.S. Pat. No. 7,205,072, to Kang et al. (the '072 patent), entitled "Layered cathode materials for lithium ion rechargeable batteries," incorporated herein by reference. The '072 patent reported a cathode material with a capacity below 250 mAh/g (milliampere hours per gram) at room temperature after 10 cycles, which is at an unspecified rate that can be assumed to be low to increase the performance value. It is noted that if fluorine is substituted for oxygen, the oxidation state of the multivalent metals are lower relative to the oxidation state of the compositions without the fluorine.

It has been found that suitable coatings provide desirable improvements in cycling properties without the use of a fluorine dopant, although it may be desirable to have a fluorine dopant in some embodiments. Furthermore, in some embodiments it is desirable to have δ=0 in the above formulas such that the compositions are simpler while still providing improved performance. For these embodiments, if z=0 along with δ=0, the formula simplifies to $Li_{1+x}Ni_\alpha Mn_\beta CO_\gamma O_2$, with the parameters outlined above, and compositions within this formula have been found to achieve extremely desirable properties.

With respect to some embodiments of materials described herein, Thackery and coworkers have proposed a composite crystal structure for some lithium rich metal oxide compositions in which a $Li_2M'O_3$ composition is structurally integrated into a layered structure with a $LiMO_2$ component. The electrode materials can be represented in two component notation as a $Li_2M'O_3.(1-a) LiMO_2$, where M is one or more metal elements with an average valance of +3 and with at least one element being Mn or Ni and M' is a metal element with an average valance of +4 and 0<a<1. For example, M can be a combination of $Ni^{+2}$, $Co^{+3}$ and $Mn^{+4}$. The overall formula for these compositions can be written as $Li_{1+x}M'_{2x}M_{1-3x}O_2$. Batteries formed from these materials have been observed to cycle at higher voltages and with higher capacities relative to batteries formed with corresponding $LiMO_2$ compositions. These materials are described further in U.S. Pat. No. 6,680,143 to Thackery et al., entitled Lithium Metal Oxide Electrodes for Lithium Cells and Batteries," and U.S. Pat. No. 6,677,082 to Thackery et al., entitled "Lithium Metal Oxide Electrodes for Lithium Cells and Batteries," both of which are incorporated herein by reference. Thackery identified Mn, Ti and Zr as being of particular interest for M' and Mn and Ni for M.

The structure of some specific layered structures is described further in Thackery et al., "Comments on the structural complexity of lithium-rich $Li_{1+x}M_{1-x}O_2$ electrodes (M=Mn,Ni,Co) for lithium batteries," Electrochemistry Communications 8 (2006), 1531-1538, incorporated herein by reference. The study reported in this article reviewed compositions with the formulas $Li_{1+x}[Mn_{0.5}Ni_{0.5}]_{1-x}O_2$ and $Li_{1+x}[Mn_{0.333}Ni_{0.333}Co_{0.333}]_{1-x}O_2$. The article also describes the structural complexity of the layered materials. The examples below are based on the performance of a material with the composition $Li_{1+x}[Mn_{0.333}Ni_{0.333}Co_{0.333}]_{1-x}O_2$. These materials are synthesized as described below, and modified with a coating. The synthesis approach and the coating provide for superior performance of the materials with respect to capacity as well as cycling properties. These improved properties of the active material along with the approach for cell construction as well as the electrolyte additive provide for the improved battery performance described herein.

High specific capacities were obtained for $Li_{1+x}Ni_\alpha Mn_\beta Co_\gamma M_\delta O_{2-z/2}F_z$ compositions using synthesis approaches described in copending U.S. patent application Ser. No. 12/246,814, now U.S. Pat. No. 8,389,160, to Venkatachalam et al. (the '814 application) entitled "Positive Electrode Material for Lithium Ion Batteries Having a High Specific Discharge Capacity and Processes for the Synthesis of these Materials" and copending U.S. patent application Ser. No. 12/332,735, now U.S. Pat. No. 8,465,873, to Lopez et al. (the '735 application) entitled "Positive Electrode Material for High Specific Discharge Capacity Lithium Ion Batteries", both of which incorporated herein by reference. In particular, surprisingly good results have been obtained for $Li[Li_{0.2}Ni_{0.175}Co_{0.10}Mn_{0.525}]O_2$. A carbonate co-precipitation process described in the '735 application gave desired lithium rich metal oxide materials having cobalt in the composition and exhibiting the high specific capacity performance with superior tap density. These copending patent applications also describe the effective use of coatings to improve performance and cycling. The '072 patent to Kang et al. examined various specific compositions including, for example, $Li_{1.2}Ni_{0.15}Mn_{0.55}Co_{0.10}O_2$, which is similar to the composition examined in the examples of the '735 application and the '814 application, although significantly improved performance is described in the '735 application and the '814 application.

The performance of the positive electrode active materials is influence by many factors. The mean particle size and the particle size distribution are two of the basic properties characterizing the positive electrode active materials, and these properties influence the rate capabilities and tap densities of the materials. Because batteries have fixed volumes, it is therefore desirable that the material used in the positive electrode of these batteries has a high tap density if the specific capacity of the material can be maintained at a desirably high value. Then, the total capacity of the battery can be higher due to the presence of more chargeable material in the positive electrode.

Synthesis Methods

Synthesis approaches described herein can be used to form layered lithium rich cathode active materials with improved specific capacity upon cycling, outstanding cycling performance and a high tap density. The synthesis methods have been adapted for the synthesis of compositions with the formula $Li_{1+x}Ni_\alpha Mn_\beta CO_\gamma M_\delta O_2$, where x ranges from about 0.05 to about 0.25, α ranges from about 0.1 to about 0.4, β ranges from about 0.3 to about 0.65, γ ranges from about 0.05 to about 0.4, and δ ranges from about 0 to about 0.1, and where M is Mg, Zn, Al, Ga, B, Zr, Ti, Ca, Ce, Y, Nb or combinations thereof. The synthesis approaches are also suitable for commercial scale up. Specifically, co-precipitation processes or sol gel processes can be used to synthesize the desired lithium rich positive electrode materials with desirable results. In particular, a hydroxide co-precipitation approach as well as a carbonate co-precipitation approach has yielded active materials with very desirable properties.

In the hydroxide co-precipitation process, metal salts are dissolved into an aqueous solvent, such as purified water, with a desired molar ratio. Suitable metal salts include, for example, metal acetates, metal sulfates, metal nitrates, and combination thereof. The concentration of the solution is generally selected between 0.1 M and 2 M. The relative molar quantities of metal salts can be selected based on the desired formula for the product materials. The pH of the solution can then be adjusted, such as with the addition of lithium hydroxide and/or ammonium hydroxide, to precipitate a metal hydroxide with the desired amounts of metal elements. Generally, the pH can be adjusted to a value between about 10 and about 12 pH units to perform the precipitation. The solution can be heated and stirred to facilitate the precipitation of the hydroxide. The precipitated metal hydroxide can then be separated from the solution, washed and dried to form a powder prior to further processing. For example, drying can be performed in an oven at about 110° C. for about 4 to about 12 hours.

The collected metal hydroxide powder can then be subjected to a heat treatment to convert the hydroxide composition to the corresponding oxide composition with the elimination of water. Generally, the heat treatment can be performed in an oven, furnace or the like. The heat treatment can be performed in an inert atmosphere or an atmosphere with oxygen present. In some embodiments, the material can be heated to a temperature of at least about 300° C. and in some embodiments from about 350° C. to about 1000° C. to convert the hydroxide to an oxide. The heat treatment generally can be performed for at least about 15 minutes, in further embodiments from about 30 minutes to 24 hours or longer, and in additional embodiments from about 45 minutes to about 15 hours. A further heat treatment can be performed to improve the crystallinity of the product material. This calcination step for forming the crystalline product generally is performed at temperatures of at least about 650° C., and in some embodiment from about 700° C. to about 1200° C., and in further embodiments from about 750° C. to about 1100° C. The calcination step to improve the structural properties of the powder generally can be performed for at least about 15 minutes, in further embodiments from about 20 minutes to about 30 hours or longer, and in other embodiments from about 30 minutes to about 24 hours. The heating steps can be combined, if desired, with appropriate ramping of the temperature to yield desired materials. A person of ordinary skill in the art will recognize that additional ranges of temperatures and times within the explicit ranges above are contemplated and are within the present disclosure.

In the carbonate co-precipitation process, metal salts are dissolved into an aqueous solvent, such as purified water, with a desired molar ratio. Suitable metal salts include, for example, metal acetates, metal sulfates, metal nitrates, and combination thereof. The concentration of the solution is generally selected between 1 M and 3M. The relative molar quantities of metal salts can be selected based on the desired formula for the product materials. The pH of the solution can then be adjusted, such as with the addition of $Na_2CO_3$ along with optionally ammonium hydroxide, to precipitate a metal carbonate with the desired amounts of metal elements. Generally, the pH can be adjusted to a value between about 6.0 to about 9.0. The solution can be heated and stirred to facilitate the precipitation of the carbonate. The precipitated metal carbonate can then be separated from the solution, washed and dried to form a powder prior to further processing. For example, drying can be performed in an oven at about 110° C. for about 4 to about 12 hours. A person of ordinary skill in the art will recognize that additional ranges of process parameters within the explicit ranges above are contemplated and are within the present disclosure.

The collected metal carbonate powder can then be subjected to a heat treatment to convert the carbonate composition to the corresponding oxide composition with the elimination of carbon dioxide. Generally, the heat treatment can be performed in an oven, furnace or the like. The heat treatment can be performed in an inert atmosphere or an atmosphere with oxygen present. In some embodiments, the material can be heated to a temperature of at least about 350° C. and in some embodiments from about 400° C. to about 800° C. to convert the carbonate to an oxide. The heat treatment generally can be performed for at least about 15 minutes, in further embodiments from about 30 minutes to 24 hours or longer, and in additional embodiments from about 45 minutes to about 15 hours. A further heat treatment can be performed to improve the crystallinity of the product material. This calcination step for forming the crystalline product generally is performed at temperatures of at least about 650° C., and in some embodiments from about 700° C. to about 1200° C., and in further embodiments from about 700° C. to about 1100° C. The calcination step to improve the structural properties of the powder generally can be performed for at least about 15 minutes, in further embodiments from about 20 minutes to about 30 hours or longer, and in other embodiments from about 1 hour to about 36 hours. The heating steps can be combined, if desired, with appropriate ramping of the temperature to yield desired materials. A person of ordinary skill in the art will recognize that additional ranges of temperatures and times within the explicit ranges above are contemplated and are within the present disclosure.

In either co-precipitation process, the lithium element can be incorporated into the material at one or more selected steps in the process. For example, a lithium salt can be incorporated into the solution prior to or upon performing the precipitation step through the addition of a hydrated lithium salt. In this approach, the lithium species is incorporated into the precipitated material in the same way as the other metals. Also, due to the properties of lithium, the lithium element can be incorporated into the material in a solid state reaction without adversely affecting the resulting properties of the product composition. Thus, for example, an appropriate amount of lithium source generally as a powder, such as $LiOH.H_2O$, $LiOH$, $Li_2CO_3$, or a combination thereof, can be mixed with the precipitated metal hydroxide or carbonate. The powder mixture is then advanced through the heating step(s) to form the oxide and then the crystalline positive electrode material.

The synthesis of lithium rich, layered metal oxide positive electrode materials by effective co-precipitation and sol-gel processes is described further in U.S. application Ser. No. 12/246,814, now U.S. Pat. No. 8,389,160, to Venkatachalam et al. (the '814 application) entitled "Positive Electrode Material for Lithium Ion Batteries Having a High Specific Discharge Capacity and Processes for the Synthesis of these Materials" and U.S. application Ser. No. 12/332,735, now U.S. Pat. No. 8,465,873, to Lopez et al. (the '735 application) entitled "Positive Electrode Material for High Specific Discharge Capacity Lithium Ion Batteries", both incorporated herein by reference. The examples in the '814 application and the '735 application are directed to the formation of $Li_{1.2}Ni_{0.175}Co_{0.10}Mn_{0.525}O_2$, although the processes described can be generalized to other stoichiometries for lithium rich layered complex metal oxides. The examples below involve the formation of $Li_{1.07}Ni_{0.31}Co_{0.31}Mn_{0.31}O_2$.

Coatings and Methods for Forming the Coatings

Inert inorganic coatings have been found to significantly improve the performance of the lithium rich layered positive electrode active materials described herein. In particular, the cycling properties of the batteries formed from the metal fluoride coated lithium metal oxide have been found to significantly improve from the uncoated material. Additionally, for metal fluoride coatings the overall capacity of the batteries also shows desirable properties with the fluoride coating, and the irreversible capacity loss of the first cycle of the battery is reduced. As discussed earlier, first cycle irreversible capacity loss of a battery is the difference between the charge capacity of the new battery and its first discharge capacity. The bulk of the first cycle irreversible capacity loss is generally attributed to the positive electrode material.

Also, other inert inorganic coatings have been proposed for stabilizing certain positive electrode active materials. Specifically, the use of metal oxide or metal phosphate coatings has been described in published U.S. patent application 2006/0147809 to Amine et al. (the '809 application), entitled "Long Life Lithium Batteries With Stabilized Electrodes," incorporated herein by reference. Specifically for active materials with a spinel or olivine crystal structure, the '809 application specifically describes coatings comprising $ZrO_2$, $TiO_2$, $WO_3$, $Al_2O_3$, $MgO$, $SiO_2$, $AlPO_4$, $Al(OH)_3$, or mixtures thereof. The metal oxides can be formed by precipitating a hydroxide and calcining, i.e. heat treating, the product to form the oxide. Alternatively a sol-gel process can be used to synthesize the oxide coatings. The metal phosphate coating can be formed by precipitation of the phosphate in contact with the powders of the materials to be coated.

A metal fluoride coating can provide an unexpected improvement in the performance of the high capacity lithium rich compositions described herein. In general, a selected metal fluoride or metalloid fluoride can be used for the coating. Similarly, a coating with a combination of metal and/or metalloid elements can be used. Metal/metalloid fluoride coatings have been proposed to stabilize the performance of positive electrode active materials for lithium secondary batteries. Suitable metals and metalloid elements for the fluoride coatings include, for example, Al, Bi, Ga, Ge, In, Mg, Pb, Si, Sn, Ti, Tl, Zn, Zr and combinations thereof. Aluminum fluoride can be a desirable coating material since it has a reasonable cost and is considered environmentally benign. The metal fluoride coating are described generally in published PCT application WO 2006/109930 to Sun et al. (the '930 PCT Application), entitled "Cathode Active Materials Coated with Fluorine Compound for Lithium Secondary Batteries and Method for Preparing the Same," incorporated herein by reference. The '930 PCT application provides results for $LiCoO_2$ coated with LiF, $ZnF_2$ or $AlF_3$. The '930 PCT application specifically refers to the following fluoride compositions, CsF, KF, LiF, NaF, RbF, TiF, AgF, $AgF_2$, $BaF_2$, $CaF_2$, $CuF_2$, $CdF_2$, $FeF_2$, $HgF_2$, $Hg_2F_2$, $MnF_2$, $MgF_2$, $NiF_2$, $PbF_2$, $SnF_2$, $SrF_2$, $XeF_2$, $ZnF_2$, $AlF_3$, $BF_3$, $BiF_3$, $CeF_3$, $CrF_3$, $DyF_3$, $EuF_3$, $GaF_3$, $GdF_3$, $FeF_3$, $HoF_3$, $InF_3$, $LaF_3$, $LuF_3$, $MnF_3$, $NdF_3$, $VOF_3$, $PrF_3$, $SbF_3$, $ScF_3$, $SmF_3$, $TbF_3$, $TiF_3$, $TmF_3$, $YF_3$, $YbF_3$, $TlF_3$, $CeF_4$, $GeF_4$, $HfF_4$, $SiF_4$, $SnF_4$, $TiF_4$, $VF_4$, $ZrF_4$, $NbF_5$, $SbF_5$, $TaF_5$, $BiF_5$, $MoF_6$, $ReF_6$, $SF_6$, and $WF_6$.

The effect of an $AlF_3$ coating on the cycling performance of $LiNi_{1/3}CO_{1/3}Mn_{1/3}O_2$ is described further in an article to Sun et al., "$AlF_3$-Coating to Improve High Voltage Cycling Performance of $Li[Ni_{1/3}CO_{1/3}Mn_{1/3}]O_2$ Cathode Materials for Lithium Secondary Batteries," J. of the Electrochemical Society, 154 (3), A168-A172 (2007). Also, the effect of an $AlF_3$ coating on the cycling performance of $LiNi_{0.8}Co_{0.1}Mn_{0.1}O_2$ is described further in an article to Woo et al., "Significant Improvement of Electrochemical Performance of $AlF_3$-Coated $Li[Ni_{0.8}CO_{0.1}Mn_{0.1}]O_2$ Cathode Materials," J. of the Electrochemical Society, 154 (11) A1005-A1009 (2007), incorporated herein by reference. A reduction in irreversible capacity loss was noted with $Al_2O_3$ coatings by Wu et al., "High Capacity, Surface-Modified Layered $Li[Li_{(1-x)/3}Mn_{(2-x)/3}Ni_{x/3}Co_{x/3}]O_2$ Cathodes with Low Irreversible Capacity Loss," Electrochemical and Solid State Letters, 9 (5) A221-A224 (2006), incorporated herein by reference.

It has been found that metal/metalloid fluoride coatings can significantly improve the performance of lithium rich layered compositions for lithium ion secondary batteries as demonstrated in the examples below. The coating improves the capacity of the batteries. However, the coating itself is not electrochemically active. When the loss of specific capacity due to the amount of coating added to a sample exceeds where the benefit of adding coating is offset by its electrochemical inactivity, reduction in battery capacity can be expected. In general, the amount of coating can be selected to balance the beneficial stabilization resulting from the coating with the loss of specific capacity due to the weight of the coating material that generally does not contribute directly to a high specific capacity of the material. In general, the amount of coating material ranges from about 0.01 mole percent to about 10 mole percent, in further embodiments from about 0.1 mole percent to about 7 mole percent, in additional embodiments from about 0.2 mole percent to about 5 mole percent, and in other embodiments from about 0.5 mole percent to about 4 mole percent. A person of ordinary skill in the art will recognize that additional ranges of coating material within the explicit ranges above are contemplated and are within the present disclosure. The amount of $AlF_3$ effective in $AlF_3$ coated metal oxide materials to improve the capacity of the uncoated material is related to the particle size and surface area of the uncoated material. In particular, a higher mole percentage of metal fluoride coating generally can be used for a higher surface area powder to achieve an equivalent effect relative to a coating on a lower surface area powder.

The fluoride coating can be deposited using a solution based precipitation approach. A powder of the positive electrode material can be mixed in a suitable solvent, such as an aqueous solvent. A soluble composition of the desired metal/metalloid can be dissolved in the solvent. Then, $NH_4F$ can be gradually added to the dispersion/solution to precipitate the metal fluoride. The total amount of coating reactants can be selected to form the desired amount of coating, and the ratio of coating reactants can be based on the stoichiometry of the coating material. The coating mixture can be heated during the coating process to reasonable temperatures, such as in the range from about 60° C. to about 100° C. for aqueous solutions for from about 20 minutes to about 48 hours, to facilitate the coating process. After removing the coated electroactive material from the solution, the material can be dried and heated to temperatures generally from about 250° C. to about 600° C. for about 20 minutes to about 48 hours to complete the formation of the coated material. The heating can be performed under a nitrogen atmosphere or other substantially oxygen free atmosphere.

Battery Performance

Batteries formed as described herein exhibited synergistic performance improvements from a combination of stabilization approaches along with the synthesis of improved positive electrode active materials. Specifically, synthesis approaches described herein are useful for the production of lithium rich positive electrode active materials with improved capacity and excellent cycling properties. Inorganic coatings can further stabilize the positive electrode materials. In addition, electrolyte additives also improve the cycling in a synergistic way with the other improvements to the materials. Based on the synergistic improvements, previously unachievable performance has been achieved over long term cycling of the lithium ion batteries with deep discharge of the cells. The improved performance results with positive electrode active materials described herein have been obtained under realistic discharge conditions for moderate current applications.

The performance of the cells can be described in terms of the positive electrode active composition and/or with respect to the overall cell performance. The cell performance can depend on the anode material and battery construction as well as the performance of the positive electrode material. The lithium rich layered metal oxide positive electrode materials described herein provide a high specific capacity and a high specific energy. Using the synthesis approaches described herein, the positive electrode materials have good crystallinity that provides for an increased capacity and energy performance, and high tap densities can be achieved. These lithium rich materials also have relatively good cycling properties.

It has been found that an inorganic coating on the lithium rich positive electrode materials provides several advantages. In particular, the coatings can surprisingly result in an increase in specific capacity and specific energy performance even though the coatings are inert. In addition, the coatings can reduce the first cycle irreversible capacity loss on the first battery cycle. Furthermore, the coatings also significantly improve the cycling performance of the cells.

The irreversible capacity loss is the difference between the charge capacity of the new battery and the first discharge capacity. To compensate for this first cycle irreversible capacity loss, extra electroactive material is included in the negative electrode such that the battery can be fully charged to the selected potential even though this lost capacity is not accessible during most of the life of the battery so that some negative electrode material is essentially wasted. The bulk of the first cycle irreversible capacity loss is generally attributed to the positive electrode material. Furthermore, with the coated positive electrode active materials described herein, the positive electrode materials demonstrate a reduced proportion of irreversible capacity loss after the first charge and discharge of the battery so that the amount of negative electrode material can be correspondingly reduced if desired. Thus, this provides for better performance of the battery since less excess negative electrode material needs to be included in the battery that does not contribute to the cycling performance of the battery.

In general, various similar testing procedures can be used to evaluate the battery performance. A specific testing procedure is described for the evaluation of the performance values described herein. The testing procedure is described in more detail in the examples below. Specifically, the battery can be cycled between 4.2 volts and 2.5 volts at room temperature or other selected temperature. For the first three cycles, a battery is discharged at a rate of C/10 to establish irreversible capacity loss. The battery is then cycled at C/3, C/2 or other selected value, which are reasonable testing rates for medium current applications. Again, the notation C/x implies that the battery is discharged at a rate to fully discharge the battery to the selected voltage minimum in x hours. The battery capacity depends significantly on the discharge rate, with lose of capacity as the discharge rate increases.

In some embodiments, the positive electrode active material has a specific capacity during the fifth cycle at a discharge rate of C/3 discharged from 4.2V to 2.5V of at least about 150 milliamp hours per gram (mAh/g) and in additional embodiments at least about 155 mAh/g. The first cycle irreversible capacity loss for the coated electroactive materials can be decreased at least about 25% relative to the equivalent performance of the uncoated materials. The tap density of the material, which is measured as described below, can be at least about 1.8 g/mL High tap density translates into high overall capacity of a battery given a fixed volume. A person of ordinary skill in the art will recognize that additional ranges of specific capacity and tap density and of decreases in irreversible capacity loss are contemplated and are within the present disclosure.

Generally, tap density is the apparent powder density obtained under stated conditions of tapping. The apparent density of a powder depends on how closely individual particles of the powder are pack together. The apparent density is affected not only by the true density of the solids, but by the particle size distribution, particle shape and cohesiveness. Generally, a larger tap density provides for the incorporation of a larger amount of active material in an electrode with fixed dimensions such that the electrode has a correspondingly greater capacity. The positive electrode active materials herein have a relatively high tap density such that the performance values per volume of the cell generally exhibit particularly desirable values.

In general, the battery performance depends on the design properties of battery. For example, the cylindrical cells described in the examples below are assembled in a cylindrical steel can, which contributes significantly to the weight of the battery. Batteries can be assembled within a foil pouch or the like, for example, in a prismatic, e.g., generally rectangular parallelepiped, shape. The foil pouch can comprise a polymer and/or metal foil or the like. Due to the potential weight reduction of the packaging materials, the specific capacity and specific energy of the battery can be greater for the foil cell design relative to the cylindrical cell design with a metal can. Furthermore, prismatic cells can be constructed with a hard case formed from metal and/or plastic. With respect to the batteries described in the examples below, if used in a prismatic cell with a pouch enclosure, the specific energy would be expected to be close to 200 Wh/kg relative to the 175 Wh/kg found for the cylindrical batteries reported in the examples. Pouch cells incorporating high energy positive electrode materials are described further in copending U.S. patent application Ser. No. 12/403,521, now U.S. Pat. No. 8,187,752, to Buckley et al., entitled "High Energy Lithium Ion Secondary Batteries," incorporated herein by reference. Also, prismatic cells generally can be packed into a volume with less wasted space due to their shape relative to cylindrical cells.

The United States Advanced Battery Consortium (US-ABC) has a set of goals for batteries used for electrical vehicles. These goals are presented in Table 1.

TABLE 1

| | Minimum Goals for System | Long Term Goal for System |
|---|---|---|
| Power Density (W/L) | 460 | 600 |
| Specific Power - Discharge, 80% DOD/30 sec (W/kg) | 300 | 400 |
| Specific Power - Regen, 20% DOD/10 sec (W/kg) | 150 | 200 |
| Energy Density - C/3 Discharge (Wh/L) | 230 | 300 |
| Specific Energy - C/3 Discharge (Wh/kg) | 150 | 200 |
| Specific Power/Specific Energy Ratio | 2:1 | 2:1 |
| Total Pack Size (kWh) | 40 | 40 |
| Life (Years) | 10 | 10 |
| Cycle Life - 80% DOD (Cycles) | 1000 | 1000 |
| Power & Capacity Degradation (% of rated spec) | 20 | 20 |
| Operating Environment (° C.) | −40 to +50 | −40 to +85 |
| Normal Recharge Time | 6 hours | 3 to 6 hours |
| High Rate Charge @ 150 W/kg | 20-70% SOC in <30 min | 40-80% SOC in 15 min |
| Continuous discharge in 1 hour - No Failure (% of rate energy capacity) | 75 | 75 |

The long term goals are compared with the performance of the batteries of Example 4 below. The temperature ranges provide for appropriate operation for vehicles exposed to a range of operating environments.

With respect to the cell performance, the current, energy and power capacities can be measured after a few cycles so that initial irreversible changes do not influence the performance values. However, after a few cycles, there is no significant performance fading experienced at longer cycling times. For convenience, cell performance independent of long term cycling is generally referenced to cycle 5 with a discharge rate of C/3. In some embodiments, the batteries can have a room temperature discharge specific energy of at least about 175 Wh/kg, in further embodiments at least about 180 Wh/kg and in other embodiments from about 185 to about 200 Wh/kg at a C/3 discharge rate for cycle 5 at a discharge from 4.2V to 2.5V. Furthermore, the batteries can have a room temperature discharge energy density of at least about 400 Wh/L, in further embodiments at least about 420 Wh/L and in other embodiments from about 430 to about 480 Wh/L at a C/3 discharge rate for cycle 5 at a discharge from 4.2V to 2.5V. With respect to the power density, the batteries can have at least 1500 W/L, in further embodiments at least about 1800 W/L, and in other embodiments from about 2200 to about 2400 W/L. Power density is measured with an 80% depth of discharge over 30 seconds. In some embodiments, a power pack can provide at least about 40 kWh of power with a volume of no more than about 128 liters. A person of ordinary skill in the art will recognize that additional ranges of specific energy, energy density and power density within the explicit ranges above are contemplated and are within the present disclosure.

In general, the cycling performance of a battery depends very significantly on the depth of discharge during the cycling. In particular, significantly improved cycling can be achieved by cycling to a lower percentage of the depth of discharge. The depth of discharge is related to the capacity of the cell based on a designed charge voltage. Thus, the design of the battery with a lower charge voltage may improve the cycling performance, but then the various performance properties, such as capacity, energy density, power density and the like is correspondingly lower. The batteries are described herein involve a cycling between 4.2V and 2.5V, which represents at least about 97% depth of discharge at the discharge rates described herein, i.e., C/2 or slower.

The improved performance batteries described herein exhibit room temperature cycling with at least about 70% of capacity at 1000 cycles, in further embodiments at least about 70% capacity at 1100 cycles, in additional embodiments at least about 70% capacity at 1200 cycles, in other embodiments from about 80% to about 85% capacity at 1000 cycles relative to cycle 5 at C/2 discharge from 4.2V to 2.5V for the fifth cycle through the 1000th cycle. For cycling at 45° C., the batteries can exhibit cycling with at least about 70% of capacity at 1000 cycles, in further embodiments at least about 70% capacity at 1100 cycles and in further embodiments from about 72% to about 80% of capacity relative to cycle 5 at C/2 discharge from 4.2V to 2.5V for the fifth cycle through the 1000th cycle. With respect to pulse operation generally, the impedance of the batteries at room temperature can be lower than 45 m-ohm when charged or discharged with 1 C pulse for 30 seconds at a state of charge of the batteries of 20% or greater. A person or ordinary skill in the art will recognize that additional ranges of cycling performance within the explicit ranges above are contemplated and are within the present disclosure.

EXAMPLES

Examples 1-3—Synthesis and Preliminary Testing of Positive Electrode Materials

The coin cell batteries tested in Examples 1-3 were all performed using coin cell batteries produced following a procedure outlined here. The lithium metal oxide (LMO) powders were mixed thoroughly with acetylene black (Super P™ from Timcal, Ltd, Switzerland) and graphite (KS 6™ from Timcal, Ltd) to form a homogeneous powder mixture. Separately, Polyvinylidene fluoride (PVDF) (KF1300™ from Kureha Corp., Japan) was mixed with N-methyl-pyrrolidone (NMP) (Honeywell-Riedel-de-Haen) and stirred overnight to form a PVDF-NMP solution. The homogeneous powder mixture was then added to the PVDF-NMP solution and mixed for about 2 hours to form homogeneous slurry. The slurry was applied onto an aluminum foil current collector to form a thin wet film using a doctor's blade coating process.

A positive electrode structure was formed by drying the aluminum foil current collector with the thin wet film in vacuum oven at 110° C. for about two hours to remove NMP. The positive electrode and the foil current collector were pressed together between rollers of a sheet mill to obtain a positive electrode structure with desired thickness. An example of a positive electrode composition developed using above process having a LMO:acetylene black:graphite:PVDF ratio of 80:5:5:10 is presented below.

The positive electrode was placed inside an argon filled glove box for the fabrication of the coin cell batteries. Lithium foil (FMC Lithium) having thickness of 125 micron was used as a negative electrode. The electrolyte was a 1 M solution of $LiPF_6$ form by dissolving $LiPF_6$ salt in a mixture of ethylene carbonate, diethyl carbonate and dimethyl carbonate (from Ferro Corp., Ohio USA) at a 1:1:1 volumetric ratio. A trilayer (polypropylene/polyethylene/polypropylene) micro-porous separator (2320 from Celgard, LLC, NC, USA) soaked with electrolyte was placed between the positive electrode and the negative electrode. A few additional drops of electrolyte were added between the electrodes. The electrodes were then sealed inside a 2032 coin cell hardware (Hohsen Corp., Japan) using a crimping process to form a coin cell battery. The resulting coin cell batteries were tested with a Maccor cycle tester to obtain charge-discharge curve and cycling stability over a number of cycles.

Example 1 Reaction of Metal Acetate with LiOH to form $Li[Li_{0.07}Ni_{0.31}CO_{0.31}Mn_{0.31}]O_2$ This example demonstrates the formation of an active positive electrode material using a hydroxide co-precipitation process.

Stoichiometric amounts of nickel acetate ($Ni(CH_3COO)_2.xH_2O$), cobalt acetate $Co(CH_3COO)_2.xH_2O$) and manganese acetate ($Mn(CH_3COO)_2.xH_2O$) were dissolved in distilled water to form a metal acetate solution. Separately an aqueous solution of LiOH was prepared. The two solutions were gradually added to a reaction vessel to form a metal hydroxide precipitate. The reaction mixture was stirred while the temperature of the reaction mixture was kept between room temperature and 80° C. The pH of the reaction mixture was about 10-12. In general, the aqueous metal sulfate solution had a concentration of 1 M to 3M, and the aqueous LiOH solution had a concentration of 1 M to 4M. The metal hydroxide precipitate was filtered, washed multiple times with distilled water, and dried at 110° C. for 16 hrs to form a metal hydroxide powder. The lithium hydroxide is added to adjust the pH, and it is expected that the washed precipitate does not comprise significant amounts of lithium.

An appropriate amount of LiOH powder was combined with the dried metal hydroxide powder and thoroughly mixed by a Jar Mill, double planetary mixer, or dry powder mixer to form a homogenous powder mixture. The homogenized powders were calcined at 400° C. for 8 hrs in air followed by an additional mixing step to further homogenize the powder formed. The homogenized powder was again calcined at 900° C. for 12 hr in air to form the lithium composite oxide powder (LMO) approximately represented by the formula Li[Li$_{0.07}$Ni$_{0.31}$Co$_{0.31}$Mn$_{0.31}$]O$_2$.

Figure 2:
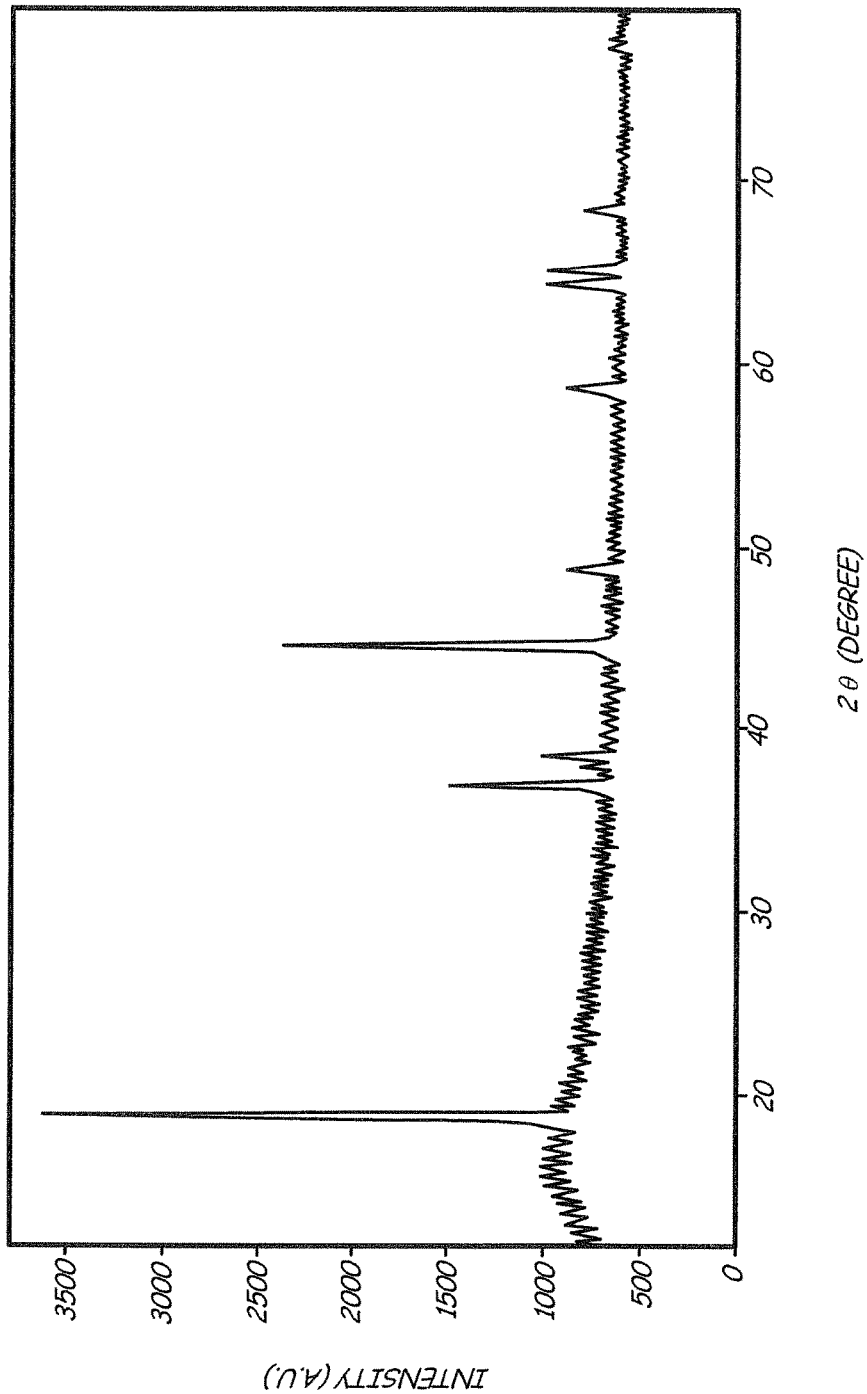
FIG. 2 is an X-ray diffraction pattern of a sample described in example 1.
Figure 3:
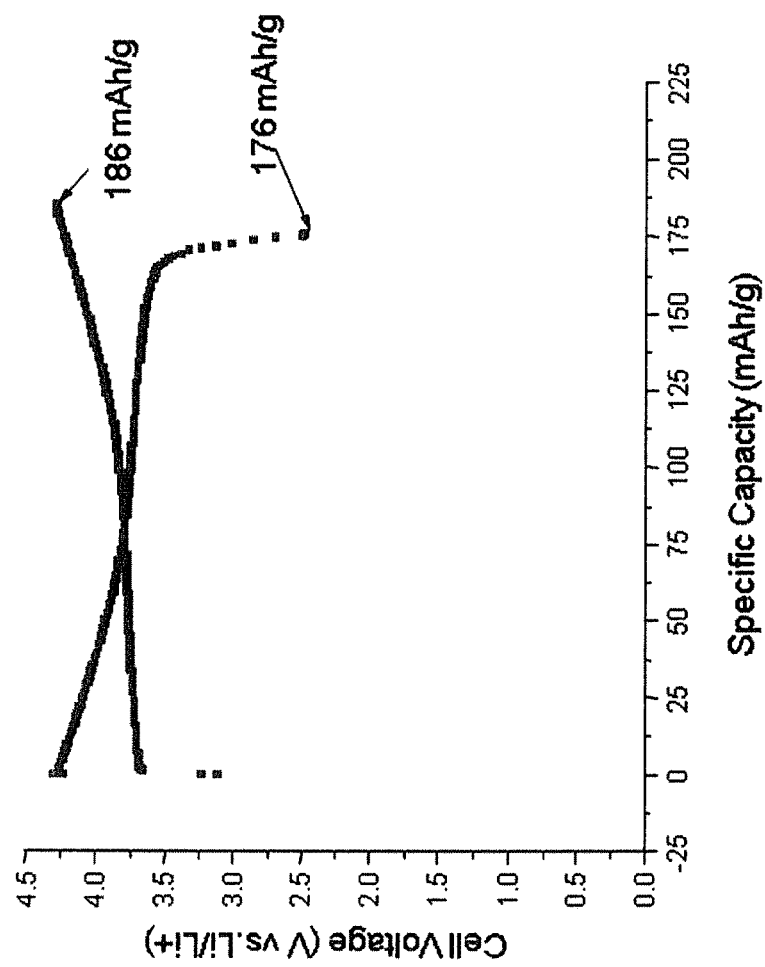
FIG. 3 is a plot of voltage versus specific capacity of a battery formed with the sample material described in example 1.

The LMO powder structure was measured by X-ray diffraction, and the X-ray diffraction pattern of the powder is shown in FIG. 2. The LMO powder was used to form coin cell following the procedure outlined above. The coin cell was tested, and the plots of voltage versus specific capacity are shown in FIG. 3. The cathode material had a discharge specific capacity of 176 mAh/g.

Example 2 Reaction of Metal Sulfate with NaOH/
NH$_4$OH to form Li[Li$_{0.07}$Ni$_{0.31}$CO$_{0.31}$Mn$_{0.31}$]O$_2$ This example demonstrates a co-precipitation process based on metal sulfate starting materials with base provided as a mixture of sodium hydroxide and ammonium hydroxide.

The processing in this example through the formation of the dried precipitate was performed in an oxygen free atmosphere. Stoichiometric amounts of metal sulfates (NiSO$_4$.xH$_2$O, CoSO$_4$.xH$_2$O, MnSO$_4$.xH$_2$O) were dissolved in distilled water to form a metal sulfate aqueous solution. Separately an aqueous solution with a mixture of NaOH and NH$_4$OH was prepared. The two solutions were gradually added to a reaction vessel to form a metal hydroxide precipitate. During the precipitation step, the reaction mixture was stirred while the temperature of the reaction mixture was kept between room temperature and 80° C. The pH of the reaction mixture was about 10-12. The aqueous metal sulfate solution had a concentration from 1 M to 3M, while the aqueous NaOH/NH$_4$OH solution had a NaOH concentration from 1 M to 3 M and a NH$_4$OH concentration from 0.2-2M. The metal hydroxide precipitate was filtered, washed multiple times with distilled water, and dried at 110° C. for 16 hrs to form a metal hydroxide powder.

An appropriate stoichiometric amount of LiOH powder was combined with the dried metal hydroxide powder and thoroughly mixed by a Jar Mill, double planetary mixer, or dry powder mixer to form a homogenous powder mixture. The homogenized powders were calcined at 500° C. for 10 hrs in air followed by an additional mixing step to further homogenize the resulting powder. The homogenized powder was again calcined at 900° C. for 12 hr in air to form the lithium composite oxide powder (LMO). The product composition has a stoichiometry of Li[Li$_{0.07}$Ni$_{0.31}$Co$_{0.31}$Mn$_{0.31}$]O$_2$.

Figure 4:
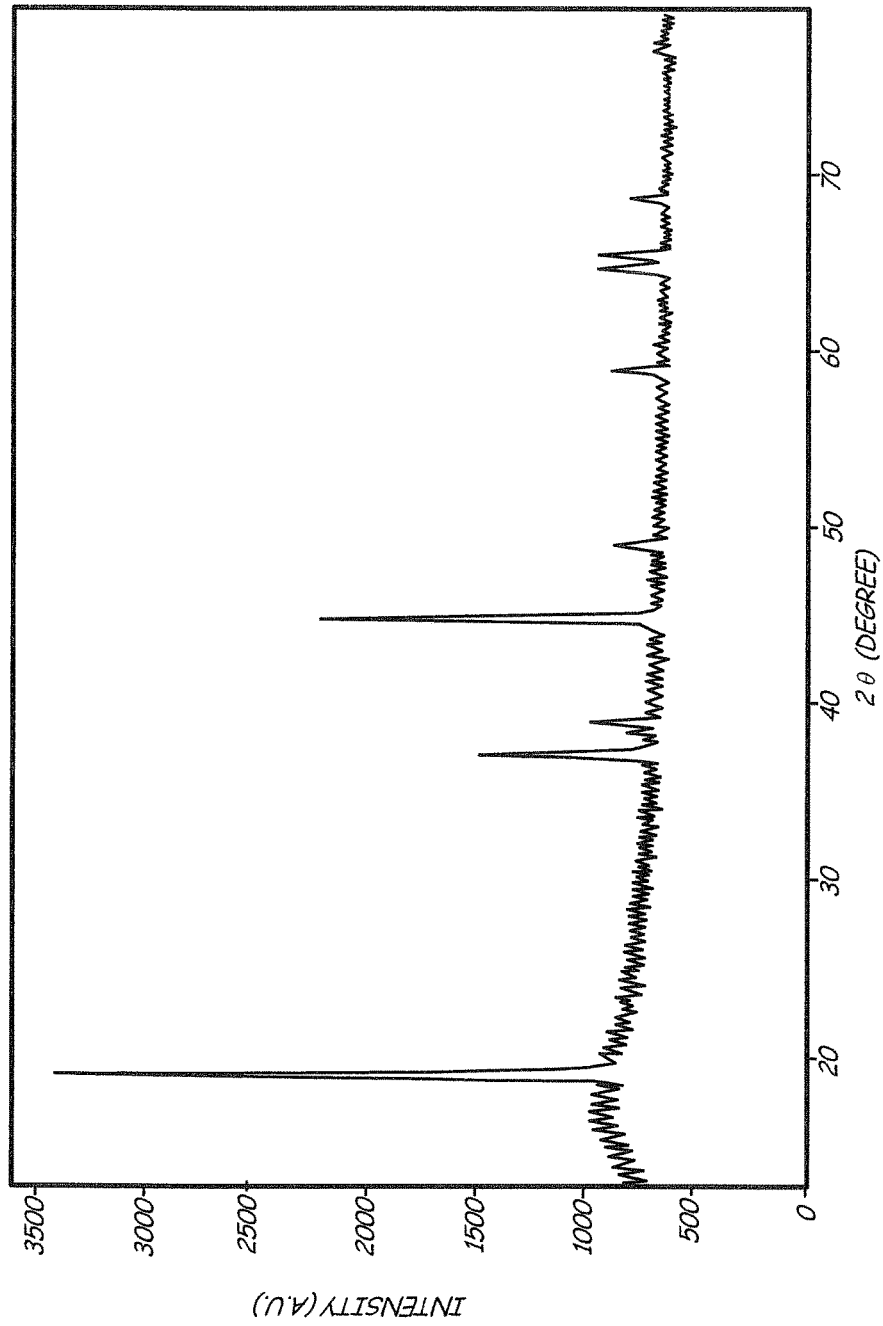
FIG. 4 is an X-ray diffraction pattern of a sample described in example 2.
Figure 5:
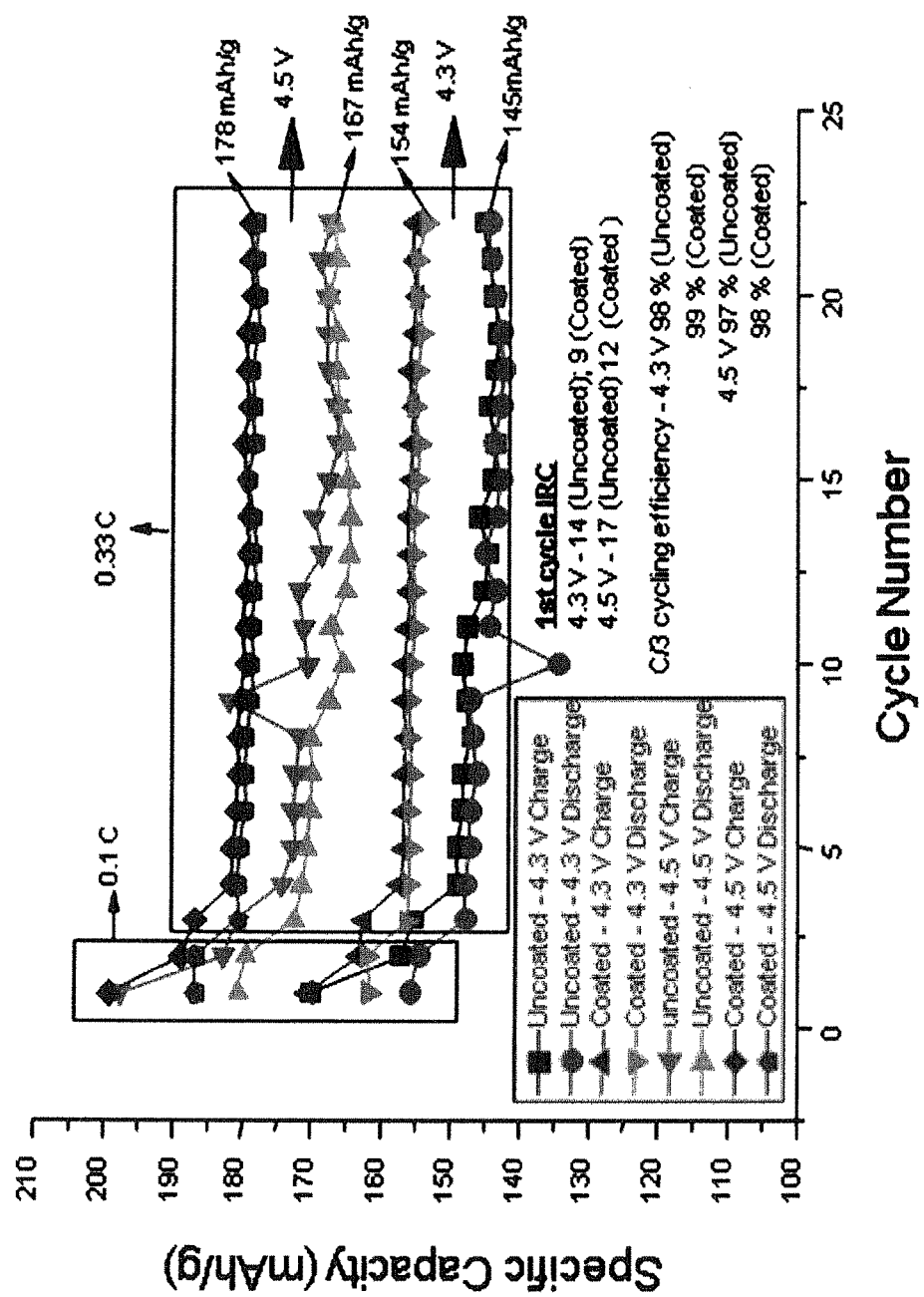
FIG. 5 is a plot of specific capacity versus cycle number of a battery formed with a positive electroactive material sample synthesized using a process in example 2 and then coated with $AlF_3$ using a process described in example 3.

The LMO powder structure was measured by X-ray diffraction, and the X-ray diffraction pattern of the powder is shown in FIG. 4. The LMO powder was used to form coin cells following the procedure outlined above. The coin cell formed was tested and the plots of specific capacity versus cycle life are shown in FIG. 5. FIG. 5 also includes data for the active powder coated with AlF$_3$, as described in the following Example. The first three cycles were measured at a discharge rate of 0.1 C. The subsequently cycles were measured at a rate of 0.33 C.

Example 3—Formation of AlF$_3$ Coated Metal Oxide Materials

This example demonstrates the formation of aluminum fluoride coated particles and presents the evaluation of the specific capacity of these materials in comparison with corresponding uncoated materials.

The metal oxide particles prepared in the above examples can be coated with a thin layer of aluminum fluoride (AlF$_3$) using a solution-assisted method. For a selected amount of aluminum fluoride coating, appropriate amount of saturated solution of aluminum nitrate was prepared in an aqueous solvent. The metal oxide particles were then added into the aluminum nitrate solution to form a mixture. The mixture was mixed vigorously for a period of time to homogenize. The length of mixing depends on the volume of the mixture. After homogenization, a stoichiometric amount of ammonium fluoride was added to the homogenized mixture to form aluminum fluoride precipitate on the surface of each particle. Upon the completion of the precipitation, the mixture was stirred at 80° C. for 5 h. The mixture was then filtered and the solid obtained was washed repeatedly to remove any un-reacted materials. The solid was calcined in nitrogen atmosphere at 400° C. for 5 h to form the AlF$_3$ coated metal oxide material.

Specifically, lithium metal oxide (LMO) particles synthesized in example 2 were coated with 3 mole % aluminum fluoride using the process described in this example. The aluminum fluoride coated LMOs were then used to thrill coin cells following the procedure outlined above. The specific capacity versus cycle life of the coin cells are shown in FIG. 5. FIG. 5 also has data from coin cells formed from uncoated LMO of example 2. First three cycles were measured at a discharge rate of 0.1 C. The subsequently cycles were measured at a rate of 0.33 C. The coated samples had significantly larger discharge capacities, especially upon cycling.

Example 4—Cylindrical Cells with a Commercial Format

This example demonstrates the outstanding cycling performance of layered lithium rich metal oxide compositions with stabilization as described herein.

A power composition represented approximately by the formula Li[Li$_{0.07}$Ni$_{0.31}$Co$_{0.31}$Mn$_{0.31}$]O$_2$ was produced using a carbonate co-precipitation process The lithium metal oxide (LMO) powders were mixed thoroughly with acetylene black (Super P™ from Timcal, Ltd, Switzerland) and graphite (KS 6™ from Timcal, Ltd) to form a homogeneous powder mixture. Separately, polyvinylidene fluoride (PVDF) was mixed with N-methyl-pyrrolidone (NMP) and stirred overnight to form a PVDF-NMP solution. The homogeneous powder mixture was then added to the PVDF-NMP solution and mixed for about 2 hours to form homogeneous slurry. The slurry was applied onto an aluminum foil current collector to form a thin wet film using a commercial coater.

A positive electrode structure was formed by drying the aluminum foil current collector with the thin wet film electrode to remove NMP. The positive electrode and current collector were pressed together between rollers of a sheet mill to obtain a positive electrode with desired thickness in association with the foil current collector. An example of a positive electrode composition developed using above process corresponding to the results described herein had a LMO:acetylene black:graphite:PVDF ratio of 95:2:1:2.

The positive electrode structure was placed inside an argon filled glove box for the fabrication of cylindrical batteries. A blend of graphite and binder was used as the negative electrode, and the negative electrode composition was coated onto a copper foil current collector. The polymer binder was a blend of styrene-butadiene rubber (SBR) and carboxymethyl cellulose. The negative electrode composition had a weight ratio graphite:SBR:CMC of 97.5:1.2:1.2. The electrolyte was a 1 M solution of LiPF$_6$ form by dissolving LiPF$_6$ salt in a mixture of ethylene carbonate, diethyl carbonate and dimethyl carbonate (from Ferro Corp., Ohio USA) at a 1:1:1 volumetric ratio. The electrolyte further comprised a stabilization additive. A trilayer (polypropylene/polyethylene/polypropylene) micro-porous separator (2320 from Celgard, LLC, NC, USA) soaked with electrolyte was placed between the positive electrode and the negative electrode. A few additional drops of electrolyte were added between the electrodes. The electrode stack with the positive electrode-separator-negative electrode was rolled and placed within cans sized for a 26700 size (26 mm×70 mm) cylindrical cell. The electrodes were then sealed to form a complete 26700 battery. The resulting cylindrical batteries were tested with a Maccor cycle tester to obtain charge-discharge curve and cycling stability over a number of cycles.

Figure 6:
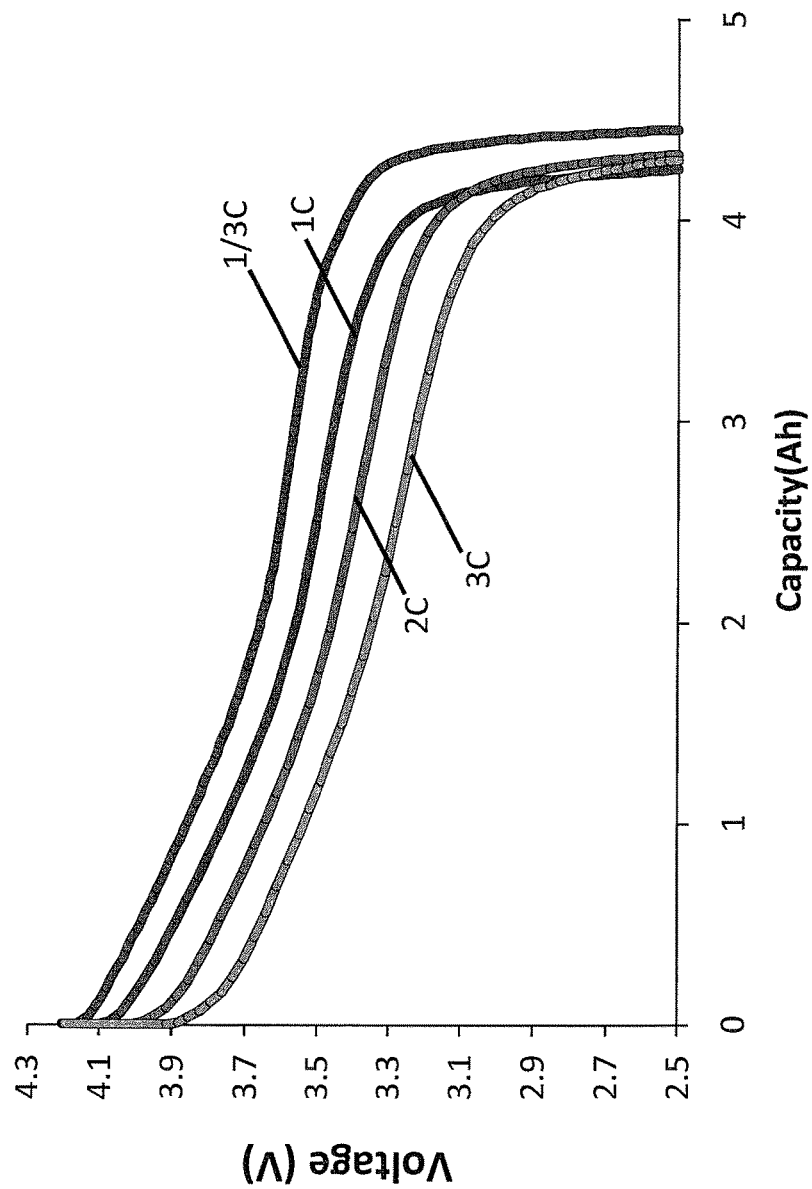
FIG. 6 is a plot of discharge voltage versus discharge capacities of cylindrical batteries of example 4 cycled at a discharge rate of ⅓ C, 1 C, 2 C, and 3 C respectively in the voltage range of 2.5V-4.2 V.

In a first set of measurements, the discharge characteristics of the batteries were tested. In particular, cylindrical batteries were cycled at a discharge rate of ⅓ C, 1 C, 2 C, and 3 C respectively in the voltage range of 2.5V-4.2 V, and a plot of discharge voltage versus discharge capacities for the fifth discharge cycle is shown in FIG. 6. The cells exhibited somewhat greater capacity at a relatively low discharge rate of ⅓ while the discharge capacity were roughly equal at discharge rates of 1 C, 2 C and 3 C.

Figure 7:
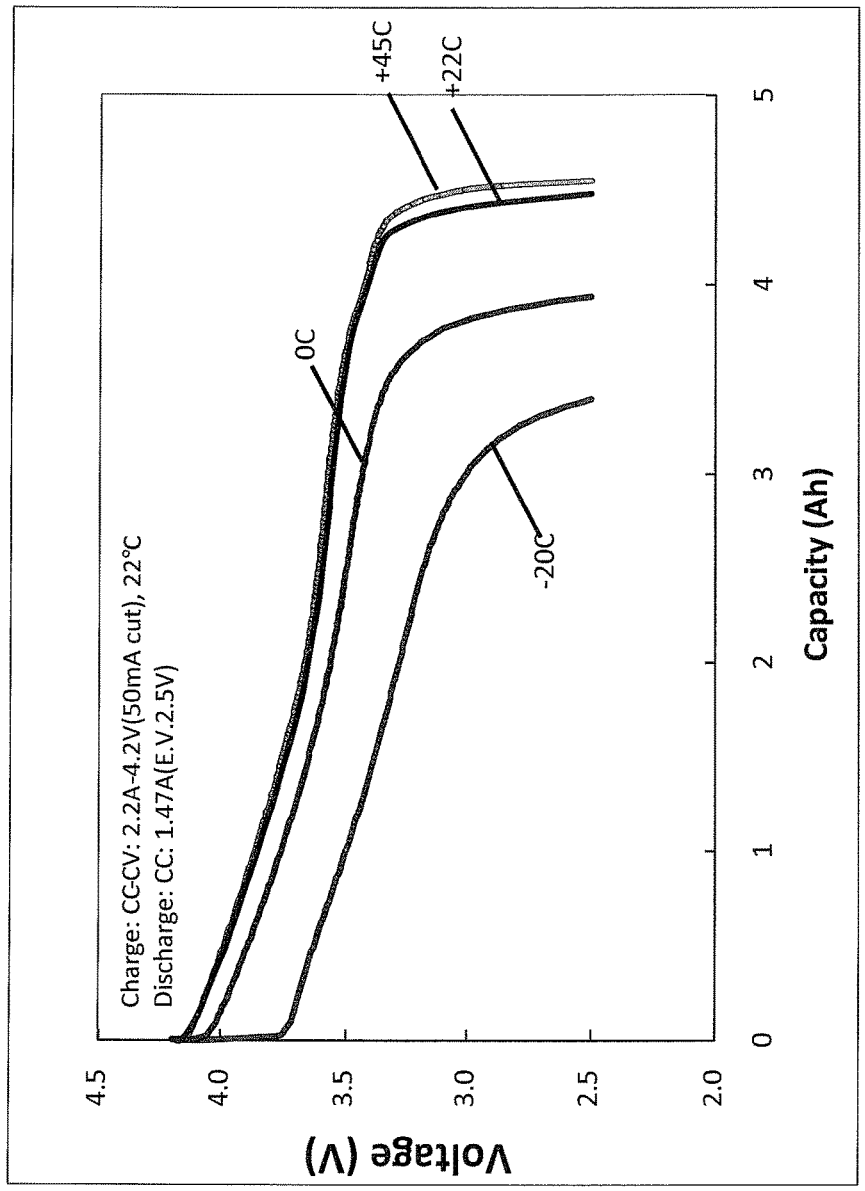
FIG. 7 is a plot of discharge voltage versus discharge capacities of the cylindrical batteries of Example 4 charged at 22° C. to 4.2 V with a 50 mA cut off and then discharged at −20° C., 0° C., 22° C. and 45° C. respectively in the voltage range of 2.5V-4.2 V.

The performance of the cells was also tested at different temperatures. Referring to FIG. 7, a set of batteries was discharged at −20° C., 0° C., 22° C. and 45° C., respectively, and the voltage is plotted as a function of capacity for the fifth discharge cycle. While the capacity decreased at lower temperatures, the capacities of the batteries were reasonable at low temperatures. At a temperature of −20° C., the batteries retained 76% of room temperature capacity.

Figure 8:
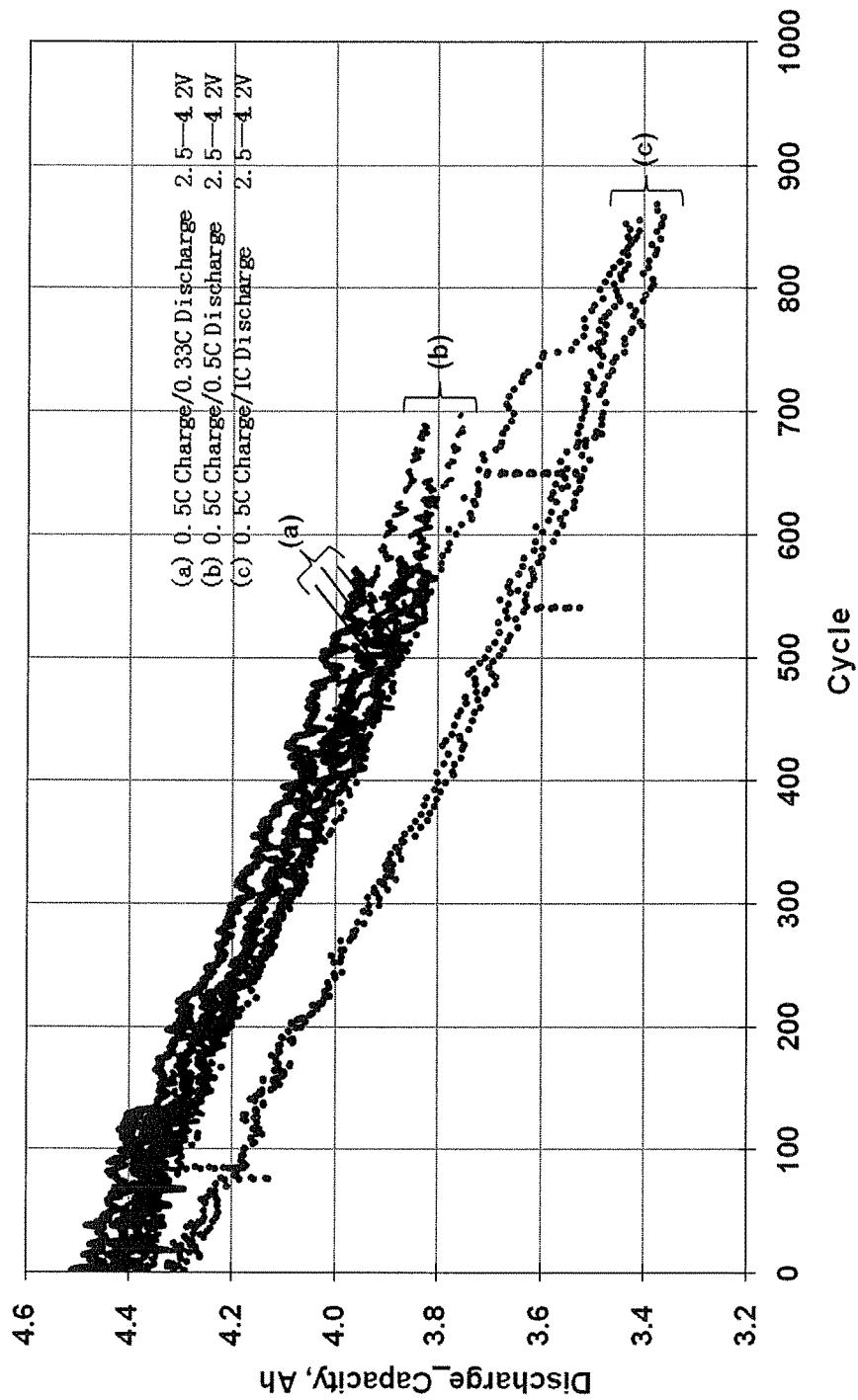
FIG. 8 is a plot of discharge capacity versus cycle number for the cylindrical batteries of Example 4 charged at rate of 0.5 C and discharged at (a) 0.33 C; (b) 0.5 C; and (c) 1 C respectively in the voltage range of 2.5V-4.2 V.
Figure 9:
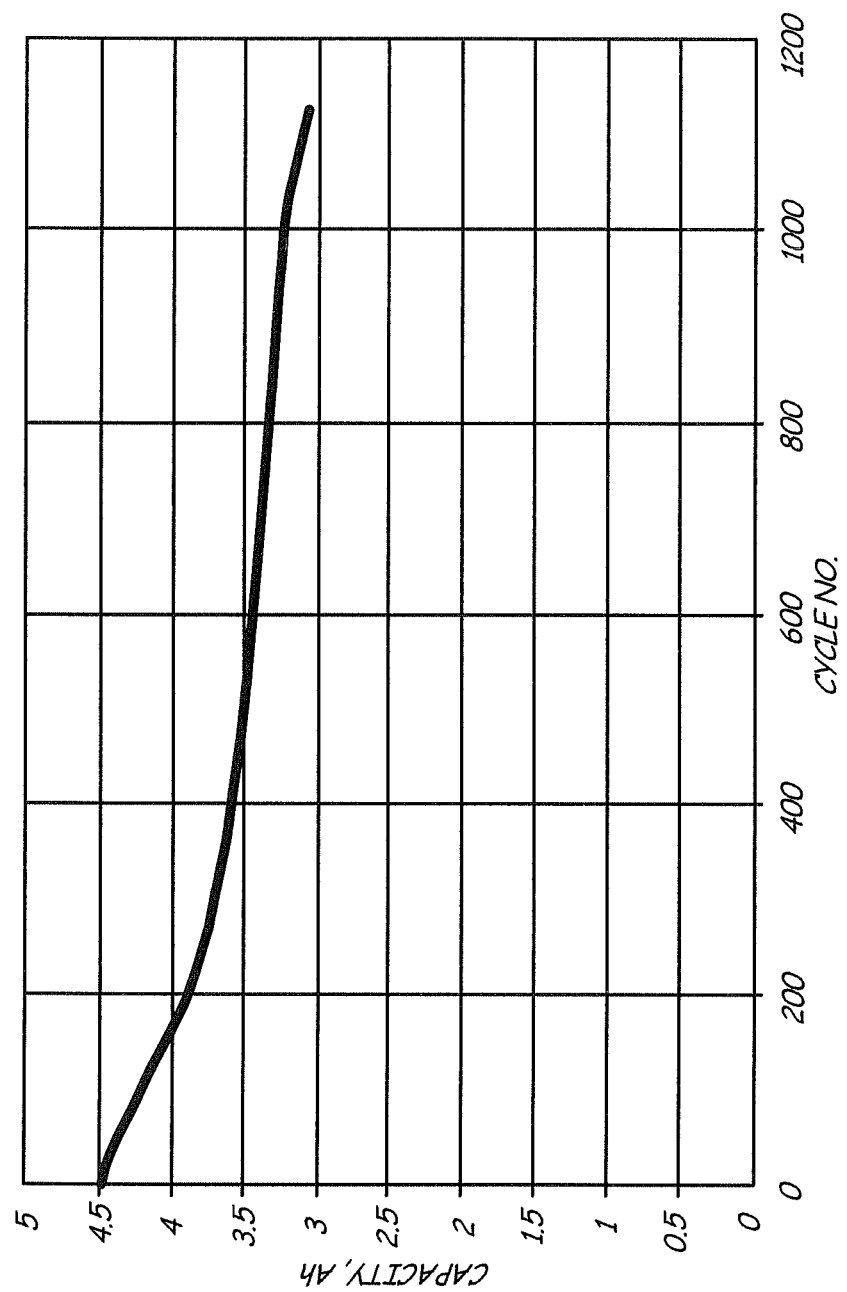
FIG. 9 is a plot of discharge capacity versus cycle number of the cylindrical batteries of Example 4 cycled at 45° C., with a charge and discharge rate of 0.5 C in the voltage range of 2.5V-4.2 V.

To test the cycling stability of the cylindrical battery at room temperature, the battery was charged at rate of 0.5 C and discharged at (a) 0.33 C; (b) 0.5 C; and (c) 1 C respectively in the voltage range of 2.5V-4.2 V. This voltage range represents close to 100% capacity with respect to the depth of discharge. Plots of discharge capacity versus cycle number are shown in FIG. 8 for the three discharge rates. Also, each rate was tested in triplicate. The battery maintained good discharge capacities up to about 900 cycles at 0.33 C, 0.5 and 1 C discharge rates at room temperature. The batteries were further tested at 45° C. at a 0.5 C charge/discharge rate in the voltage range of 2.5V-4.2, and a plot of discharge capacity versus cycle number is shown in FIG. 9. The battery maintained good discharge capacity up to about 1100 cycles at 45° C.

Figure 10:
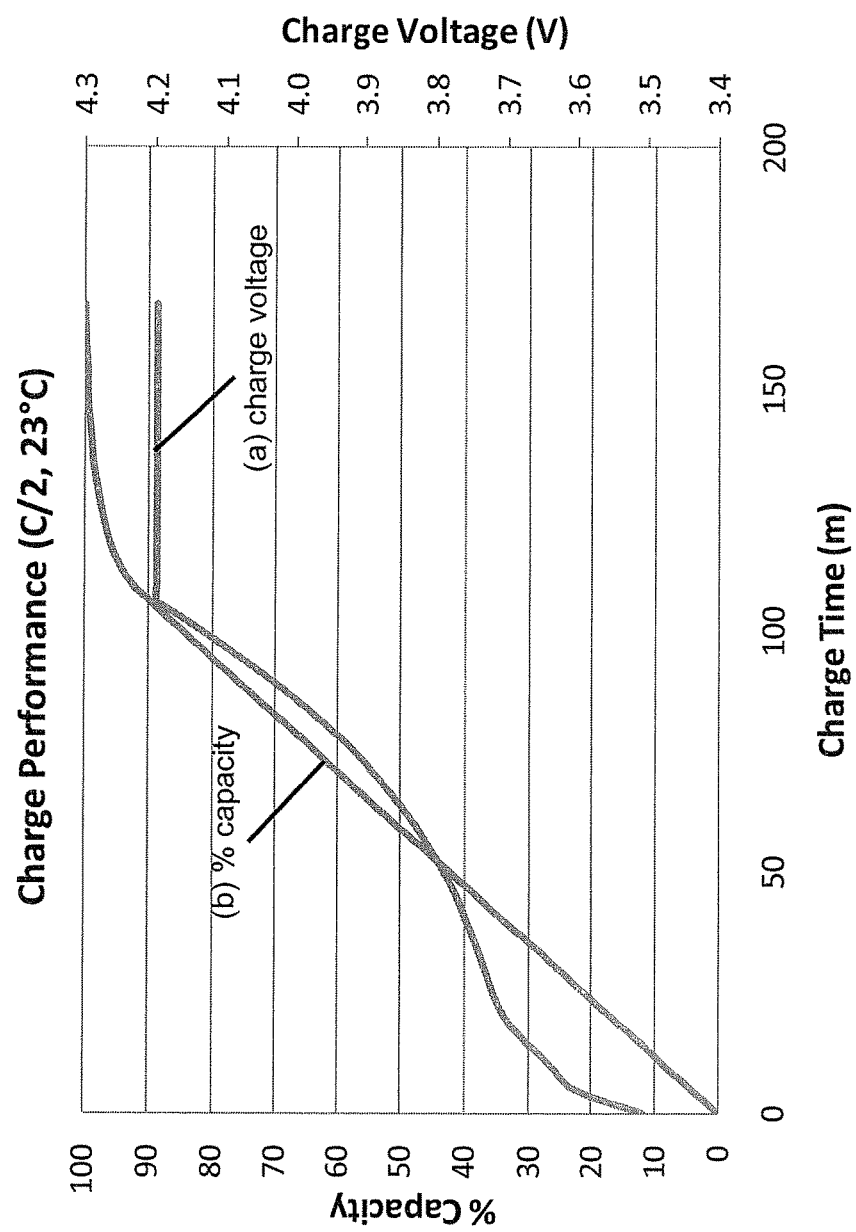
FIG. 10 is (a) a plot of charge voltage versus charge time and (b) a plot of percentage capacity charged versus charge time for the cylindrical batteries of Example 4 cycled at 23° C. with a charge rate of 0.5 C.

In general, the cycling performance in the set of tests was based on an upper limit on the charge voltage of 4.2V. Thus, the initial charging of the cell is taken to 4.2V, and the cell is then cycled to this upper limit on the charge voltage. However, the material has the capability to be charged to a higher voltage. Thus, when the cell was charged to 4.2V, the active material is not at full capacity when a voltage of 4.2V was first reached. Referring to FIG. 10, the percentage capacity charged and charge voltage are recorded versus charge time when the battery was charged at 23° C. at a charging rate of C/2. The percent capacity was about 90% when a voltage of 4.2 V was reached.

Figure 11:
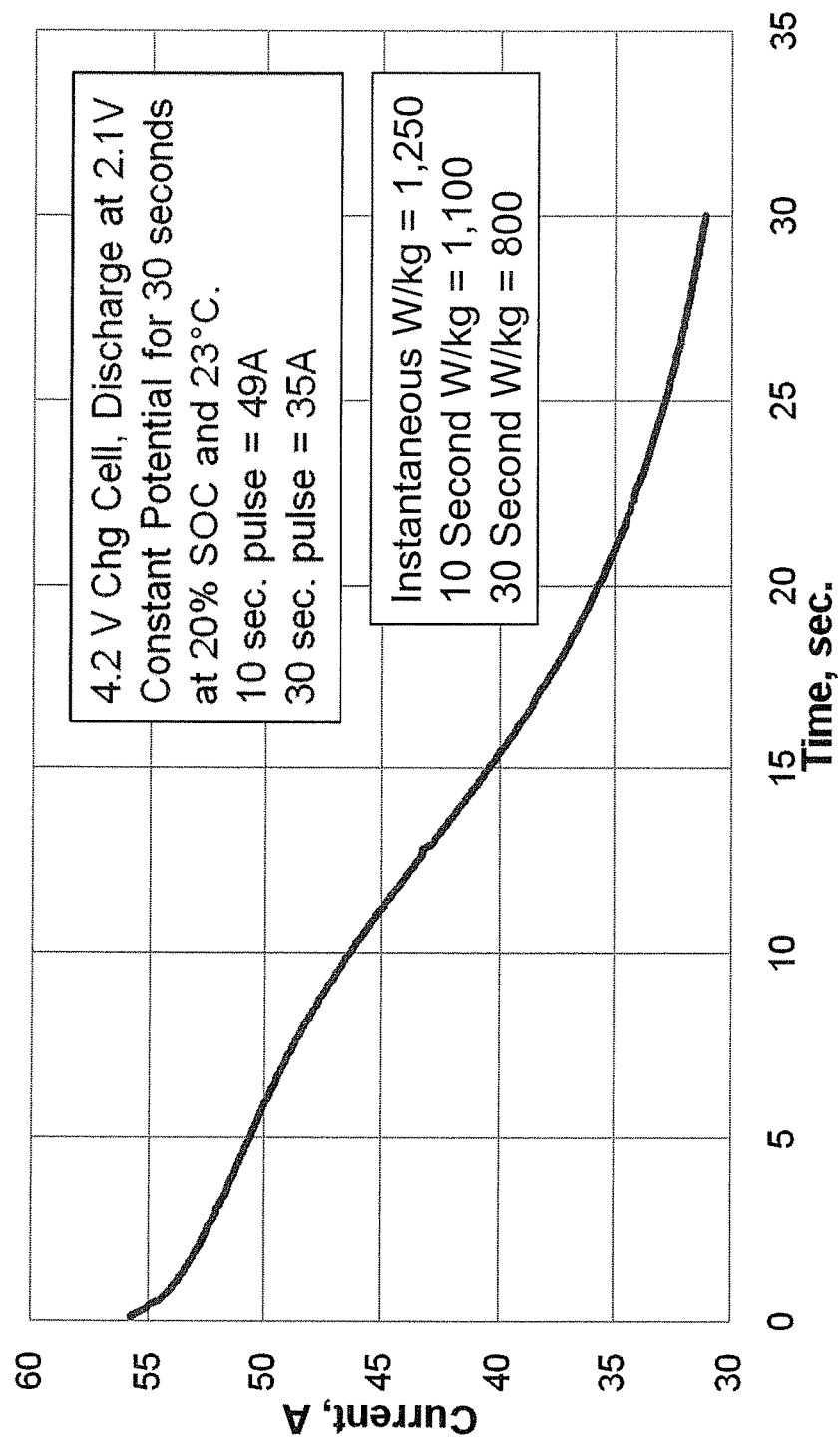
FIG. 11 is a plot of discharge current versus discharge time of the cylindrical batteries of Example 4 charged to 4.2 V, discharged to 20% state of charge (80% depleted) and then discharged at 2.1 V constant potential for 30 seconds at 23° C.

The capacity during discharge of the cell near its end of life was also examined for these cells. After initially charging the cell to 4.2V, the cell was discharged to a 20% state of charge, i.e., the battery was 80% depleted. Then, the battery was discharged at 2.1V constant potential for 30 seconds at 23° C. A plot of discharge current as a function of time is shown in FIG. 11.

Also, for batteries charged initially to 4.2V and then discharged to a 20% state of charge, the maximum current available in a set time frame was evaluated based on the cell staying at a voltage greater than 2.1V. At a 10 second discharge pulse, delivered current during discharge was 49 A while staying above 2.1V. At a 30 second discharge pulse, the delivered discharge current of the battery was 35 A while staying at a voltage greater than 2.1V. The specific power of the battery was calculated from the current capability measurements. Specifically, the delivered current is multiplied by the average voltage during the discharge pulse. For example, for the 30 second pulse, the specific power was calculated as follows: (35 A×2.2V)/94.5 g=800 W/kg. For the 10 second pulse, the specific power was 1,100 W/kg. In addition, with instantaneous discharge, the specific power was 1,250 W/kg.

Figure 12:
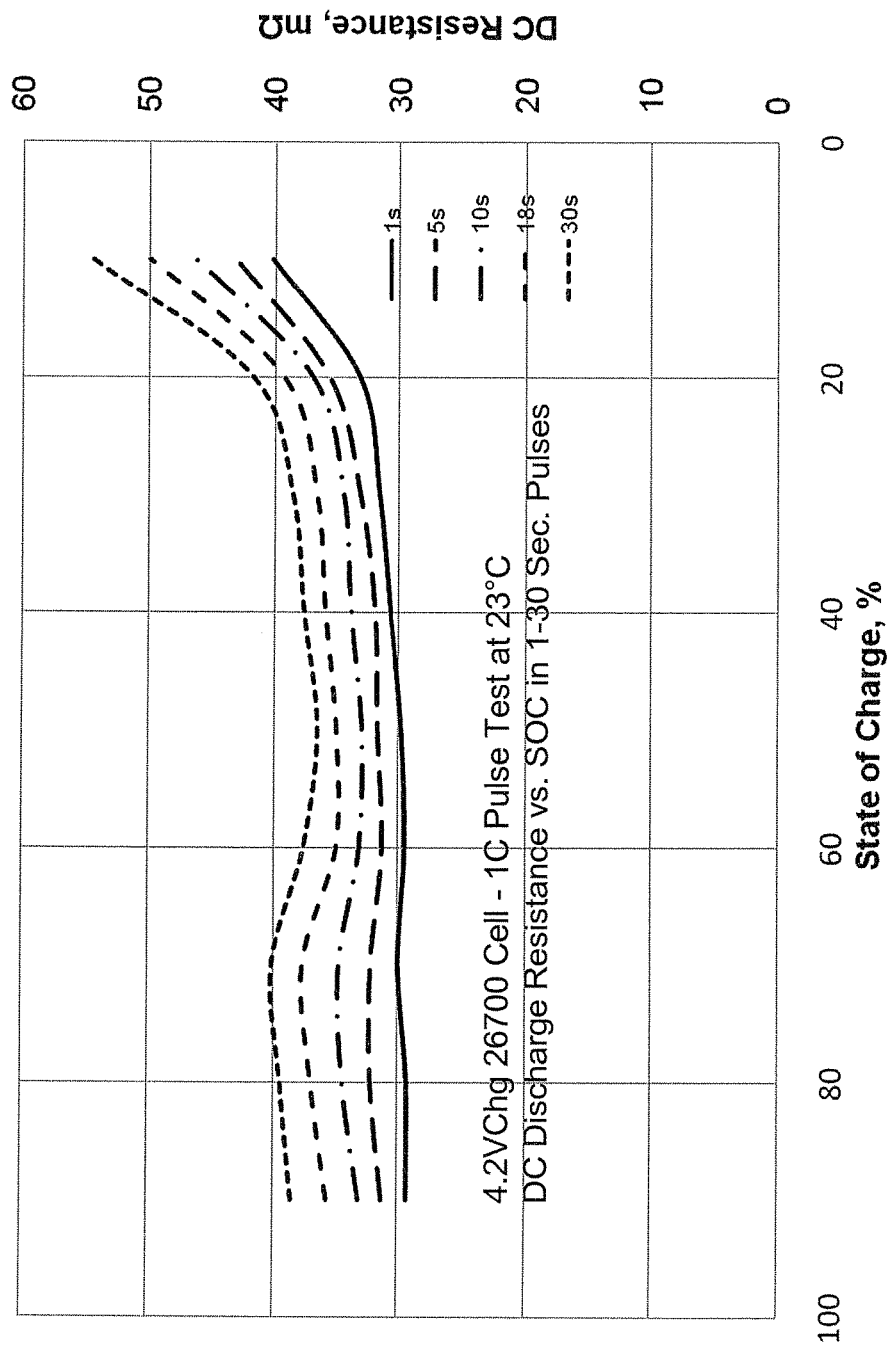
FIG. 12 is a plot of DC discharge resistance versus percent of state of charge of the cylindrical batteries of Example 4 charged to 4.2 V and then subjected to 1 C Pulse Test at 23° C. in 1, 5, 10, 18, and 30 second pulses.
Figure 13:
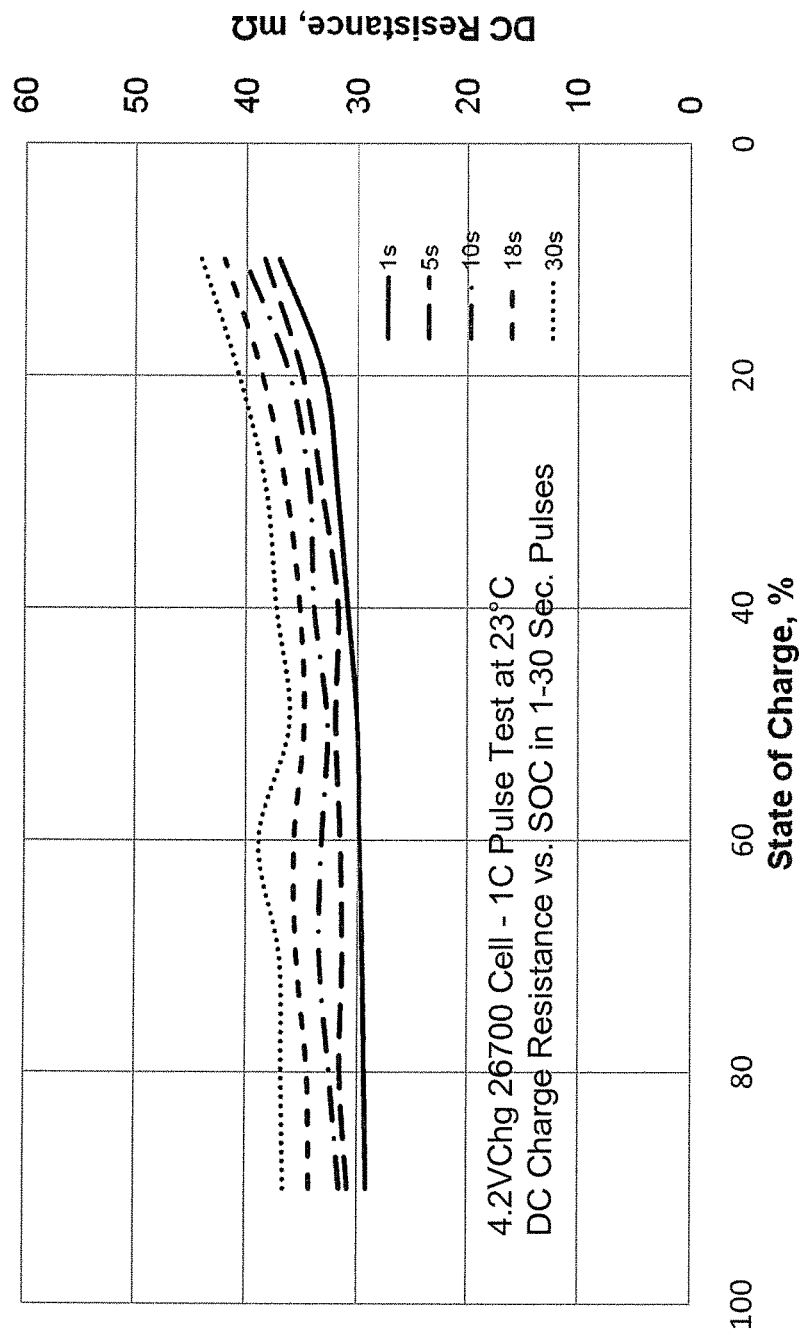
FIG. 13 is a plot of DC charge resistance versus percent of state of charge of the cylindrical batteries of Example 4 charged to 4.2 V and then subjected to 1 C Pulse Test at 23° C. in 1, 5, 10, 18, and 30 second pulses.

To perform further pulse testing, the battery is charged to 4.2V and then subjected to 1 C Pulse Test at 23° C. with 1, 5, 10, 18, and 30 second pulses. In the pulse test, the DC resistance was evaluated as a function of the state of charge starting form an initial 90% state of charge, corresponding to an initial charge to 4.2V. The plots of DC discharge/charge resistance versus state of charge of the battery are shown in FIG. 12 (discharge) and FIG. 13 (charge) respectively for the five different pulse times. Detailed 1 C Pulse Test data is outlined in Table 2 below.

TABLE 2

|  |  |  | SOC, % | | | | |
| --- | --- | --- | --- | --- | --- | --- | --- |
|  |  |  | 90 | 80 | 70 | 60 | 50 |
| 1 second Pulse | Discharge | OCV | 4.054 | 3.942 | 3.836 | 3.738 | 3.676 |
|  |  | R, mΩ | 29.3 | 29.3 | 30.0 | 29.5 | 29.8 |
|  | Charge | OCV | 4.055 | 3.943 | 3.842 | 3.742 | 3.679 |
|  |  | R, mΩ | 29.1 | 29.3 | 29.5 | 29.8 | 30.0 |
| 5 second Pulse | Discharge | OCV | 4.053 | 3.940 | 3.837 | 3.739 | 3.677 |
|  |  | R, mΩ | 31.4 | 32.3 | 32.3 | 31.4 | 31.8 |
|  | Charge | OCV | 4.052 | 3.940 | 3.841 | 3.743 | 3.678 |
|  |  | R, mΩ | 30.9 | 31.6 | 31.4 | 31.6 | 32.0 |
| 10 second Pulse | Discharge | OCV | 4.054 | 3.942 | 3.838 | 3.741 | 3.678 |
|  |  | R, mΩ | 33.2 | 34.5 | 34.8 | 33.2 | 33.0 |
|  | Charge | OCV | 4.055 | 3.940 | 3.840 | 3.743 | 3.678 |
|  |  | R, mΩ | 31.6 | 32.5 | 33.4 | 33.2 | 32.7 |
| 18 second Pulse | Discharge | OCV | 4.053 | 3.941 | 3.838 | 3.741 | 3.678 |
|  |  | R, mΩ | 35.7 | 37.0 | 37.7 | 35.0 | 35.0 |
|  | Charge | OCV | 4.048 | 3.937 | 3.837 | 3.741 | 3.677 |
|  |  | R, mΩ | 34.3 | 34.5 | 35.5 | 35.7 | 34.8 |

TABLE 2-continued

| | | | | | | | |
|---|---|---|---|---|---|---|---|
| 30 second Pulse | Discharge | OCV | 4.054 | 3.941 | 3.839 | 3.741 | 3.678 |
| | | R, mΩ | 38.6 | 39.5 | 40.2 | 37.7 | 36.6 |
| | Charge | OCV | 4.044 | 3.933 | 3.834 | 3.738 | 3.675 |
| | | R, mΩ | 36.6 | 36.8 | 37.0 | 38.9 | 36.1 |

| | | | SOC, % | | | |
|---|---|---|---|---|---|---|
| | | | 40 | 30 | 20 | 10 |
| 1 second Pulse | Discharge | OCV | 3.638 | 3.606 | 3.560 | 3.473 |
| | | R, mΩ | 30.7 | 31.6 | 33.2 | 40.2 |
| | Charge | OCV | 3.641 | 3.610 | 3.565 | 3.477 |
| | | R, mΩ | 30.9 | 31.8 | 33.0 | 37.0 |
| 5 second Pulse | Discharge | OCV | 3.640 | 3.609 | 3.565 | 3.476 |
| | | R, mΩ | 32.0 | 33.2 | 35.7 | 43.2 |
| | Charge | OCV | 3.642 | 3.612 | 3.569 | 3.478 |
| | | R, mΩ | 31.8 | 33.2 | 35.0 | 38.4 |
| 10 second Pulse | Discharge | OCV | 3.640 | 3.609 | 3.564 | 3.476 |
| | | R, mΩ | 33.9 | 34.5 | 37.0 | 46.4 |
| | Charge | OCV | 3.640 | 3.611 | 3.566 | 3.476 |
| | | R, mΩ | 33.9 | 34.3 | 36.1 | 40.2 |
| 18 second Pulse | Discharge | OCV | 3.639 | 3.609 | 3.565 | 3.476 |
| | | R, mΩ | 35.9 | 36.6 | 39.3 | 50.0 |
| | Charge | OCV | 3.640 | 3.610 | 3.566 | 3.474 |
| | | R, mΩ | 35.2 | 36.4 | 38.6 | 42.0 |
| 30 second Pulse | Discharge | OCV | 3.640 | 3.608 | 3.565 | 3.475 |
| | | R, mΩ | 37.7 | 38.6 | 41.8 | 54.5 |
| | Charge | OCV | 3.638 | 3.608 | 3.562 | 3.471 |
| | | R, mΩ | 37.3 | 38.2 | 40.7 | 44.1 |

The battery was further subjected to abuse tests including a nail penetration test, a crush test, and a hot box test where the battery was kept in 150° C. hotbox for 3 hours. No fire or explosion was observed from these abuse test and the photos of the abused batteries are shown in FIG. 14.

The overall performance of the batteries is summarized in Table 3.

TABLE 3

| | |
|---|---|
| Capacity | 4.4 Ah |
| Nominal Voltage | 3.7 V |
| Size | 26 mm (OD) × 70 mm (H) |
| Weight | 92.7 grams |
| Cycle Life | >1000 at about 100% DOD |
| Cathode | Li[Li$_{0.07}$Ni$_{0.31}$Co$_{0.31}$Mn$_{0.31}$]O$_2$ |
| Cathode Capacity | 160 mAh/gm discharge at 0.33 C from 4.2-2.5 V |

The capacity and nominal voltage are evaluated at the fifth cycle for full discharge at a C/3 rate.

The United States Advanced Battery Consortium (US-ABC) has a set of goals for batteries used for electrical vehicles, which is compared with the performance of the battery of Example 3 in Table 4.

TABLE 4

| | Long Term Goal for System | Envia EC26700 Cell |
|---|---|---|
| Power Density (W/L) | 600 | 2200 |
| Specific Power - Discharge, 80% DOD/30 sec (W/kg) | 400 | 900 |
| Specific Power - Regen, 20% DOD/10 sec (W/kg) | 200 | 550 |
| Energy Density - C/3 Discharge (Wh/L) | 300 | 439 |
| Specific Energy - C/3 Discharge (Wh/kg) | 200 | 180 |
| Specific Power/Specific Energy Ratio | 2:1 | 5:1 |
| Cycle Life - 80% DOD (Cycles) | 1000 | 1000 |
| Power & Capacity Degradation (% of rated spec) | 20 | 20 |
| Operating Environment (° C.) | −40 to +85 | −40 to (under test) |

TABLE 4-continued

| | Long Term Goal for System | Envia EC26700 Cell |
|---|---|---|
| Normal Recharge Time | 3 to 6 hours | 3 to 6 hours |
| High Rate Charge @ 150 W/kg | 40-80% SOC in 15 min | 40-80% SOC in 15 min |
| Continuous discharge in 1 hour - No Failure (% of rate energy capacity) | 75 | 75 |

The power and capacity degradation is the allowable loss as a percentage of the rated specification before reaching the end of life of the battery. The batteries in this example meet or exceed all of the parameters for the long range performance except for specific energy, which has a value of 90% of the target. The use of a foil enclosure in place of a metal can or the use of a higher energy lithium rich composition can comfortably increase the specific energy well above the target value.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. An electric vehicle comprising an electric motor, a drive train comprising wheels mounted on axles driven by the electric motor, a passenger compartment comprising seats and controls wherein the passenger compartment is supported at least in part by the drive train, and an electrical power pack comprising a plurality of lithium ion batteries wherein the power pack provides at least about 40 kWh of power and a volume of no more than about 128 liters and wherein the lithium ion batteries comprise:

a negative electrode, a positive electrode, a separator between the negative electrode and the positive electrode, and a non-aqueous electrolyte comprising lithium ions from a primary lithium salt comprising lithium hexafluorophosphate, lithium hexafluoroarsenate, lithium bis(trifluoromethyl sulfonyl imide), lithium trifluoromethane sulfonate, lithium tris(trifluoromethyl sulfonyl) methide, lithium tetrafluoroborate, lithium perchlorate, lithium tetrachloroaluminate, lithium chloride or combinations thereof and a lithium salt stabilizing additive, wherein the electrodes and separator are wound or the battery further comprises at least one additional negative electrode and one additional positive electrode in a stack configuration, wherein the concentration of lithium salt stabilizing additive in the electrolyte is from about 0.01 weight percent to about 9 weight percent, wherein the negative electrode comprises graphite and the positive electrode comprises from 92 wt % to 97 wt % of an active composition comprising a layered lithium metal oxide approximately represented by the formula $Li_{1+x}Ni_\alpha Mn_\beta Co_\gamma O_2$, where x ranges from about 0.05 to about 0.15, α ranges from about 0.1 to about 0.4, β range from about 0.3 to about 0.65, and γ ranges from about 0.05 to about 0.4 and an inorganic coating, and wherein the battery has a room temperature discharge specific energy of at least about 175 Wh/kg at a C/3 discharge rate for cycle 5 at a discharge from 4.2V to 2.5V and a cycle life with at least about 70% capacity at 1000 cycles relative to cycle 5 at a C/2 discharge from 4.2V to 2.5V for the fifth cycle through the 1000th cycle.

2. The electric vehicle of claim 1 wherein the plurality of lithium ion batteries comprise cylindrical 26700 type cells.

3. The electric vehicle of claim 1 wherein the plurality of lithium ion batteries comprise prismatic shaped batteries with a polymer pouch casing.

4. The electric vehicle of claim 1 wherein active composition of the positive electrode has a coating comprising a metal fluoride and wherein the plurality of lithium ion batteries comprise an electrolyte, the electrolyte comprising a stabilizing additive.

5. The electric vehicle of claim 1 wherein the lithium intercalation composition is approximately represented by the formula $Li_{1+x}[M_{0.333}Ni_{0.333}Co_{0.333}]_{1-x}O_2$, wherein x is between about 0.05 and 0.125.

6. The electric vehicle of claim 1 wherein the lithium intercalation composition of the positive electrode has a coating comprising a metal fluoride.

7. The electric vehicle of claim 1 wherein the lithium salt stabilizing additive comprises a lithium(chelato)borate or lithium(chelato)phosphate.

8. The electric vehicle of claim 1 wherein the batteries further comprise a cylindrical metal case.

9. The electric vehicle of claim 1 wherein the batteries have a foil case and a prismatic shape.

10. The electric vehicle of claim 1 wherein the batteries have a room temperature discharge specific energy of at least about 195 Wh/kg at a C/3 discharge rate for cycle 5 at a discharge from 4.2V to 2.5V.

11. The electric vehicle of claim 1 wherein the batteries have a cycle life with at least about 70% capacity at 1100 cycles relative to cycle 5 at a C/2 discharge from 4.2V to 2.5V for the fifth cycle through the 1100th cycle.

12. The electric vehicle of claim 1 wherein the batteries have a room temperature energy density of at least about 425 Wh/L at a C/3 discharge rate for cycle 5 at a discharge from 4.2V to 2.5V.

* * * * *